(12) United States Patent
Shoda et al.

(10) Patent No.: US 6,794,114 B2
(45) Date of Patent: Sep. 21, 2004

(54) OPTICAL RECORDING MEDIUM

(75) Inventors: Hisashi Shoda, Kanagawa (JP); Rieko Hata, Kanagawa (JP); Satoru Imamura, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 126 days.

(21) Appl. No.: 10/015,659

(22) Filed: Dec. 17, 2001

(65) Prior Publication Data

US 2002/0051941 A1 May 2, 2002

Related U.S. Application Data

(63) Continuation of application No. PCT/JP01/03267, filed on Apr. 17, 2001.

(30) Foreign Application Priority Data

Apr. 17, 2000 (JP) ........................................ 2000-114611

(51) Int. Cl.$^7$ ................................................ G11B 7/24
(52) U.S. Cl. ............................ 430/270.16; 430/270.19; 430/945; 428/64.8; 369/288
(58) Field of Search ................... 430/270.16, 270.19, 430/945; 428/64.8; 369/288

(56) References Cited

U.S. PATENT DOCUMENTS

| | | | | |
|---|---|---|---|---|
| 4,358,527 A | * | 11/1982 | Bailey et al. | 430/223 |
| 5,389,419 A | | 2/1995 | Maeda et al. | 430/945 |
| 5,447,823 A | | 9/1995 | Ochiai et al. | 430/945 |
| 6,225,023 B1 | * | 5/2001 | Okamoto et al. | 430/270.16 |
| 6,551,682 B1 | * | 4/2003 | Tosaki et al. | 430/270.16 |

FOREIGN PATENT DOCUMENTS

| | | | |
|---|---|---|---|
| DE | 33 37 118 | | 4/1985 |
| EP | 0 141 920 | | 5/1985 |
| EP | 0 376 327 | | 7/1990 |
| EP | 0 483 387 | | 5/1992 |
| EP | 0887202 | * | 12/1998 |
| JP | 48-89932 | | 11/1973 |
| JP | 4-73188 | | 3/1992 |
| JP | 4-308791 | | 10/1992 |
| JP | 4-361088 | | 12/1992 |
| JP | 04-361088 | * | 12/1992 |
| JP | 7-251567 | | 10/1995 |
| JP | 8-332772 | | 12/1996 |
| JP | 10-006651 | * | 1/1998 |
| JP | 11-181313 | * | 7/1999 |
| WO | 00/55136 | * | 9/2000 |

OTHER PUBLICATIONS

Patent Abstracts of Japan, JP 2001–035004, Feb. 9, 2001.

* cited by examiner

*Primary Examiner*—Martin Angebranndt
(74) *Attorney, Agent, or Firm*—Oblon, Spivak, McClelland, Maier & Neustadt, P.C.

(57) ABSTRACT

The object of the present invention is to provide an optical recording medium which is excellent in the recording sensitivity and suitable for the high speed recording.

Thus, the present invention is an optical recording medium comprising a substrate and a laser-writable and readable recording layer provided thereon, wherein said recording layer contains a chelate dye comprising two or more azo compounds having different structures and a divalent or more metal ion, and said azo compounds are a selected from azo compounds represented by the following general formula (I) and the general formula (II).

4 Claims, No Drawings

OPTICAL RECORDING MEDIUM

This application is a Continuation of prior International application No. PCT/JP01/03267 Filed on Apr. 17, 2001.

International application PCT/JP01/0326 has not been published in English under PCT Article 21(2).

TECHNICAL FIELD

The present invention relates to an optical recording medium using a chelate dye comprising azo compounds and a metal in a recording layer.

BACKGROUND OF THE INVENTION

Since optical recording using a laser enables high density storing and reproduction of data, the development has been advanced in particular in recent years. As the media for use for optical recording, a magneto-optical recording medium, a phase-change optical recording medium, and an organic dye optical recording medium have been conventionally proposed.

Of these media, an organic dye optical recording medium has been considered to be superior in view of inexpensiveness and simple manufacturing process.

Examples of organic dye optical recording media include a recordable compact disc (CD-R) comprising an organic dye layer having laminated thereon a metal layer having high reflectance which is capable of overwriting can be exemplified.

As the dyes for a recording layer of CD-R, various dyes, e.g., cyanine dyes, phthalocyanine dyes, metal chelate dyes, etc., have been proposed and put to practical use. Focusign on the metal chelate dyes excellent in light fastness and environmentally durable, the present inventors have proposed many optical recording media using metal chelate dyes, including a domestic re-publication No. 3-818057 of PCT international patent publication, and JP-A-6-65514 (the term "JP-A" as used herein means an "unexamined published Japanese patent application").

In general, the optical recording medium is required to have good storage stability, high light fastness, broad margins, such as recording power, and a high reflectance. The dyes themselves to be used for optical recording media are also required to have performances capable of realizing these characteristics.

However, it has so far been very difficult to satisfy these characteristics at the same time.

Even when a plurality of dyes are used in combination so as to compensate for mutual weak points, the properties of a dye inferior in properties are generally liable to be revealed strongly. Accordingly, merely mixing dyes is insufficient to improve the performances of the optical recording medium.

DISCLOSURE OF THE INVENTION

As a result of extensive studies for attaining these objects, the present inventors have found that a plurality of performances required of the optical recording medium can be improved at the same time by using, in the recording layer, an azo metal chelate dye comprising a plurality of azo compounds having different structures coordinated to one metal.

That is, the present invention was achieved by an optical recording medium comprising a substrate and a laser-writable and/or readable recording layer provided thereo, wherein the recording layer contains a chelate dye comprising two or more azo compounds having different structures and a divalent or more metal ion, and the azo compounds are selected from the azo compounds represented by the following general formula (I) and the general formula (II):

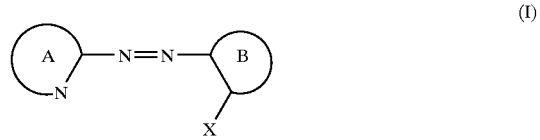

(I)

wherein ring A represents an aromatic heterocyclic ring which may have substituent(s); ring B represents an aromatic hydrocarbon ring, an aromatic heterocyclic ring, or a condensed ring of one of these rings with saturated ring(s), and these rings each may have substituent(s) other than X; and X represents a group having an active hydrogen;

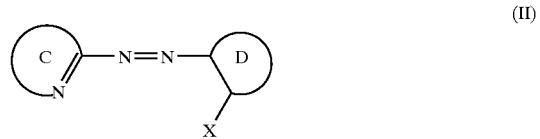

(II)

wherein ring C represents an aromatic heterocyclic ring which may have substituent(s); ring D represents an aromatic hydrocarbon ring, an aromatic heterocyclic ring, or a condensed ring of one of these rings with saturated ring(s), and these rings each may have substituent(s) other than X; and X represents a group having an active hydrogen.

BEST MODE FOR CARRYING OUT THE INVENTION

The present invention will be described in detail below.

The optical recording medium according to the present invention in which an azo metal chelate dye comprising azo compounds and a metal is used in the recording layer has characteristics capable of simultaneously satisfying a plurality of performances required, e.g., excellent light fastness, environmental durability and high recording sensitivity.

In the general formulae (I) and (II), ring A and ring C each represents an aromatic heterocyclic ring, and each of these heterocyclic rings may have substituent(s). Ring A and ring C each preferably represents the ring structure of one to three 5-membered ring and/or 6-membered ring condensed each other, more preferably a single ring or a condensed ring of two rings. Illustrative examples thereof include the following structures.

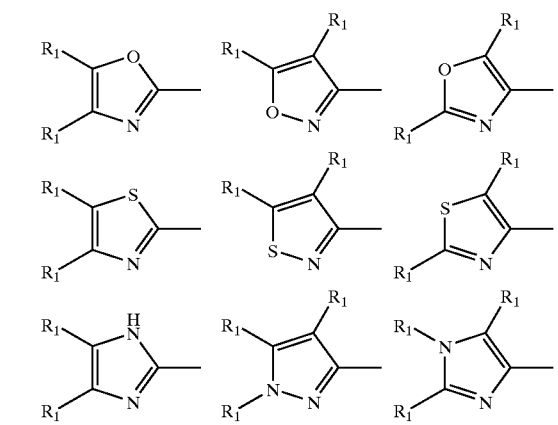

-continued

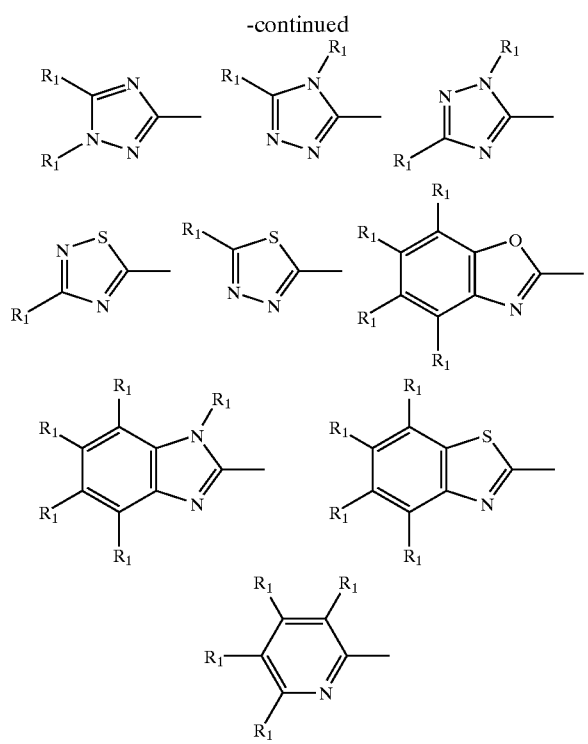

All of $R_1$ in the same ring structure may be the same or different, and each $R_1$ represents a hydrogen atom, a straight chain or branched alkyl group having from 1 to 6 carbon atoms (e.g., methyl, ethyl, n-propyl, isopropyl, n-butyl, sec-butyl, tert-butyl, n-pentyl, n-hexyl), a cyclic alkyl group having from 3 to 6 carbon atoms (e.g., cyclopropyl, cyclobutyl, cyclopentyl, cyclohexyl), an alkoxyl group having from 1 to 6 carbon atoms (e.g., methoxy, ethoxy, n-propoxy, isopropoxy, n-butoxy, sec-butoxy, tert-butoxy, n-pentyloxy, n-hexyloxy), an alkylcarbonyl group having from 1 to 7 carbon atoms (e.g., acetyl, propionyl, butyryl, isobutyryl, valeryl, isovaleryl, pivaloyl, hexanoyl, heptanoyl), a straight chain or branched alkenyl group having from 2 to 6 carbon atoms (e.g., vinyl, 1-propenyl, allyl, isopropenyl, 2-butenyl, 1,3-butadienyl, 1-pentenyl, 1-hexenyl), a cyclic alkenyl group having from 3 to 6 carbon atoms (e.g., cyclopentenyl, cyclohexenyl), a halogen atom (e.g., fluorine, chlorine, bromine, iodine), a formyl group, a hydroxyl group, a carboxyl group, a hydroxyalkyl group having from 1 to 6 carbon atoms (e.g., hydroxymethyl, hydroxyethyl), an alkoxycarbonyl group having from 2 to 7 carbon atoms (e.g., methoxycarbonyl, ethoxycarbonyl, n-propoxycarbonyl, isopropoxycarbonyl, n-butoxycarbonyl, sec-butoxycarbonyl, tert-butoxycarbonyl, n-pentyloxycarbonyl, n-hexyloxycarbonyl), a nitro group, a cyano group, an amino group, an alkylamino group having from 1 to 6 carbon atoms (e.g., methylamino, ethylamino, n-propylamino, n-butylamino), a dialkylamino group having from 2 to 12 carbon atoms (e.g., dimethylamino, diethylamino, di-n-propylamino, di-n-butylamino), an alkoxycarbonylalkyl group having from 3 to 7 carbon atoms (e.g., methoxycarbonylmethyl, ethoxycarbonylmethyl, n-propoxycarbonylmethyl, isopropoxycarbonylethyl), an alkylthio group having from 1 to 6 carbon atoms (e.g., methylthio, ethylthio, n-propylthio, sec-butylthio, tert-butylthio, n-pentylthio, n-hexylthio), an alkylsulfonyl group having from 1 to 6 carbon atoms (methylsulfonyl, ethylsulfonyl, n-propylsulfonyl, isopropylsulfonyl, n-butylsulfonyl, sec-butylsulfonyl, tert-butylsulfonyl, n-pentylsulfonyl, n-hexylsulfonyl), an aryl group having from 6 to 16 carbon atoms which may have substituent(s), an arylcarbonyl group having from 7 to 17 carbon atoms which may have substituent(s), —$CR_2$=$C(CN)R_3$ [wherein $R_2$ represents a hydrogen atom or an alkyl group having from 1 to 6 carbon atoms (e.g., methyl, ethyl, n-propyl, isopropyl, n-butyl, sec-butyl, tert-butyl, n-pentyl, n-hexyl); and $R_3$ represents a cyano group or an alkoxycarbonyl group having from 2 to 7 carbon atoms (e.g., methoxycarbonyl, ethoxycarbonyl, n-propoxycarbonyl, isopropoxycarbonyl, n-butoxycarbonyl, sec-butoxycarbonyl, tert-butoxycarbonyl, n-pentyloxycarbonyl, n-hexyloxycarbonyl)],

[wherein $R_4$ to $R_6$ each represents a hydrogen atom, a nitro group, a halogen atom (e.g., fluorine, chlorine, bromine, iodine), a straight chain or branched alkyl group having from 1 to 6 carbon atoms (e.g., methyl, ethyl, n-propyl, isopropyl, n-butyl, sec-butyl, tert-butyl, n-pentyl, n-hexyl), a cyclic alkyl group having from 3 to 6 carbon atoms (e.g., cyclopropyl, cyclobutyl, cyclopentyl, cyclohexyl), an alkoxyl group having from 1 to 6 carbon atoms (e.g., methoxy, ethoxy, n-propoxy, isopropoxy, n-butoxy, sec-butoxy, tert-butoxy, n-pentyloxy, n-hexyloxy)],

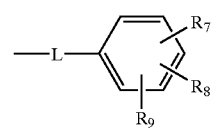

[wherein $R_7$ to $R_9$ each represents a hydrogen atom, a nitro group, a halogen atom (e.g., fluorine, chlorine, bromine, iodine), a straight chain or branched alkyl group having from 1 to 6 carbon atoms (e.g., methyl, ethyl, n-propyl, isopropyl, n-butyl, sec-butyl, tert-butyl, n-pentyl, n-hexyl), a cyclic alkyl group having from 3 to 6 carbon atoms (e.g., cyclopropyl, cyclobutyl, cyclopentyl, cyclohexyl), an alkoxyl group having from 1 to 6 carbon atoms (e.g., methoxy, ethoxy, n-propoxy, isopropoxy, n-butoxy, sec-butoxy, tert-butoxy, n-pentyloxy, n-hexyloxy)]; and L represents —$SCH_2$— or —$SO_3$—, a halogenated alkyl group having from 1 to 6 carbon atoms (e.g., trifluoromethyl, pentafluoroethyl, heptafluoro-n-propyl, heptafluoroisopropyl, perfluoro-n-butyl, perfluoro-sec-butyl, perfluoro-tert-butyl, perfluoro-n-pentyl, perfluoro-n-hexyl), a halogenated alkoxyl group having from 1 to 6 carbon atoms (e.g., trifluoromethoxy, pentafluoroethoxy, 2,2,2-trifluoroethoxy, pentafluoroethoxy, perfluoro-n-butoxy, perfluoro-sec-butoxy, perfluoro-tert-butoxy, perfluoro-n-pentyloxy, perfluoro-n-hexyloxy), or a halogenated alkylthio group having from 1 to 6 carbon atoms (e.g., trifluoromethylthio, pentafluoroethylthio, heptafluoro-n-propylthio, heptafluoroisopropylthio, perfluoro-n-butylthio, perfluoro-sec-butylthio, perfluoro-n-pentylthio, perfluoro-n-hexylthio).

Substituent $R_1$ is preferably represents a hydrogen atom, an unsubstituted alkyl group, a halogenated alkyl group, an alkylthio group, an unsubstituted alkoxyl group, a halogenated alkoxyl group, an alkenyl group, a formyl group, a carboxyl group, an alkylcarbonyl group, an alkoxycarbonyl group, a cyano group, a nitro group or a halogen atom.

Particularly preferable structure of ring A or ring C is a condensed structure of two rings represented by the following formula (V):

$$\text{(V)}$$

wherein ring E represents an aromatic hydrocarbon ring which may have substituent(s), or an aromatic heterocyclic ring which may have substituent(s).

Ring E is preferably a 6-membered single ring, specifically a benzene ring, a pyridine ring, a diazine ring or a triazine ring.

The substituents that the ring E may have include the substituents described above as $R_1$, and the preferred substituents are also the same as in $R_1$.

The most preferred ring represented by the formula (V) is a benzothiazole ring.

In the general formulae (I) and (II), ring B and ring D each represents an aromatic hydrocarbon ring, an aromatic heterocyclic ring, or a condensed ring of any of these rings with saturated ring(s), and these rings each may have substituent (s) other than X.

As the aromatic hydrocarbon ring and aromatic heterocyclic ring, 5- or 6-membered, monocyclic or bicyclic are preferred. As the condensed ring of these aromatic rings with saturated ring(s), the rings formed by condensation of these aromatic rings and one or two saturated 5-membered ring(s) or saturated 6-membered ring(s) may be exemplified.

The specific examples of the aromatic hydrocarbon rings include a benzene ring and a naphthalene ring. As the examples of the aromatic heterocyclic rings, a pyrazole ring and a pyridone ring represented by the following formulae can be exemplified.

The condensed rings of these aromatic rings with saturated ring(s) are described later.

Ring B and ring D more preferably represent a benzene ring or a condensed ring of a benzene ring with saturated ring(s), and the structure represented by the following general formula (IV) is particularly preferred.

$$\text{(IV)}$$

In the formula, the benzene ring G may have a substituent (s) other than X and $NR_{10}R_{11}$.

$R_{10}$ and $R_{11}$ (1) independently represents a group described later, (2) are bonded to each other to form a ring, or (3) each is bonded to a carbon atom constituting ring G and forms a saturated ring condensed with ring G.

In case (1), $R_{10}$ and $R_{11}$ each represents a hydrogen atom, a straight chain or branched alkyl group having from 1 to 6 carbon atoms which may have substituent(s) (e.g., methyl, ethyl, n-propyl, isopropyl, n-butyl, sec-butyl, tert-butyl, n-pentyl, n-hexyl), an aryl group having from 6 to 18 carbon atoms which may have substituent(s) (e.g., phenyl, tolyl, xylyl, naphthyl), a straight chain or branched alkenyl group having from 2 to 6 carbon atoms (e.g., vinyl, 1-propenyl, allyl, isopropenyl, 2-butenyl, 1,3-butadienyl, 1-pentenyl, 1-hexenyl), a cyclic alkenyl group having from 3 to 6 carbon atoms (e.g., cyclopentenyl, cyclohexenyl), or a cyclic alkyl group having from 3 to 6 carbon atoms which may have substituent(s) (e.g., cyclopropyl, cyclobutyl, cyclopentyl, cyclohexyl).

The above alkyl, aryl, alkenyl, cyclic alkenyl and cyclic alkyl groups may have substituent(s) such as an alkoxyl group having from 1 to 6 carbon atoms (e.g., methoxy, ethoxy, n-propoxy, isopropoxy, n-butoxy, sec-butoxy, tert-butoxy, n-pentyloxy, n-hexyloxy), an alkoxyalkoxy group having from 2 to 12 carbon atoms (e.g., methoxymethoxy, ethoxymethoxy, propoxymethoxy, methoxyethoxy, ethoxyethoxy, propoxyethoxy, methoxypropoxy, ethoxypropoxy, methoxybutoxy, ethoxybutoxy), an alkoxyalkoxyalkoxy group having from 3 to 15 carbon atoms (e.g., methoxymethoxymethoxy, methoxymethoxyethoxy, methoxymethoxymethoxy, methoxyethoxyethoxy, ethoxymethoxymethoxy, ethoxymethoxyethoxy, ethoxyethoxymethoxy, ethoxyethoxyethoxy), an allyloxy group, an aryl group having from 6 to 18 carbon atoms (e.g., phenyl, tolyl, xylyl, naphthyl), an aryloxy group from 6 to 18 carbon atoms (e.g., phenoxy, tolyloxy, xylyloxy, naphthyloxy), a nitro group, a cyano group, a hydroxyl group, a tetrahydrofuryl group, an alkylamino group having from 1 to 6 carbon atoms (e.g., methylamino, ethylamino, n-propylamino, n-butylamino), a dialkylamino group having from 2 to 12 carbon atoms (e.g., dimethylamino, diethylamino, di-n-propylamino, di-n-butylamino), an alkylsulfonylamino group having from 1 to 6 carbon atoms (e.g., methylsulfonylamino, ethylsulfonylamino, n-propylsulfonylamino, isopropylsulfonylamino, n-butylsulfonylamino, sec-butylsulfonylamino, tert-butylsulfonylamino, n-pentylsulfonylamino, n-hexylsulfonylamino), a halogen atom (e.g., fluorine, chlorine, bromine, iodine), an alkoxycarbonyl group having from 2 to 7 carbon atoms (e.g., methoxycarbonyl, ethoxycarbonyl, n-propoxycarbonyl, isopropoxycarbonyl, n-butoxycarbonyl, sec-butoxycarbonyl, tert-butoxycarbonyl, n-pentyloxycarbonyl, n-hexyloxycarbonyl), or an alkylcarbonyloxy group having from 2 to 7 carbon atoms (e.g., methylcarbonyloxy, ethylcarbonyloxy, n-propylcarbonyloxy, isopropylcarbonyloxy, n-butylcarbonyloxy, sec-butylcarbonyloxy, tert-butylcarbonyloxy, n-pentylcarbonyloxy, n-hexylcarbonyloxy).

$R_{10}$ and $R_{11}$ each particularly preferably is an unsubstituted straight chain or branched alkyl group or an alkyl group substituted with halogen atom(s).

In the general formula (IV), benzene ring G may have substituent(s) other than X and $NR_{10}R_{11}$, and the examples of the substituents include a straight chain or branched alkyl group having from 1 to 6 carbon atoms (e.g., methyl, ethyl, n-propyl, isopropyl, n-butyl, sec-butyl, tert-butyl, n-pentyl, n-hexyl), an alkoxyl group having from 1 to 6 carbon atoms (e.g., methoxy, ethoxy, n-propoxy, isopropoxy, n-butoxy, sec-butoxy, tert-butoxy, n-pentyloxy, n-hexyloxy), a halogen atom (e.g., fluorine, chlorine, bromine, iodine), a cyano group, a nitro group, a hydroxyl group, an alkylsulfonyl group having from 1 to 6 carbon atoms (methylsulfonyl, ethylsulfonyl, n-propylsulfonyl, isopropylsulfonyl, n-butylsulfonyl, sec-butylsulfonyl, tert-butylsulfonyl, n-pentylsulfonyl, n-hexylsulfonyl), an alkoxycarbonyl group having from 2 to 7 carbon atoms (e.g., methoxycarbonyl, ethoxycarbonyl, n-propoxycarbonyl, isopropoxycarbonyl, n-butoxycarbonyl, sec-butoxycarbonyl, tert-butoxycarbonyl, n-pentyloxycarbonyl, n-hexyloxycarbonyl), and a thiocyanato group, As the substituents of benzene ring G, an unsubstituted straight chain or branched alkyl group or an unsubstituted alkoxyl group are particularly preferred.

In case (2), i.e., the case where $R_{10}$ and $R_{11}$ are bonded to each other to form a nitrogen-containing heterocyclic ring, the ring may be a saturated ring or may be a ring containing a saturated group, but is preferably a saturated ring. The size of the ring is preferably a 5- to 7-membered ring, more preferably a 5- or 6-membered ring.

Specifically the following groups can be exemplified.

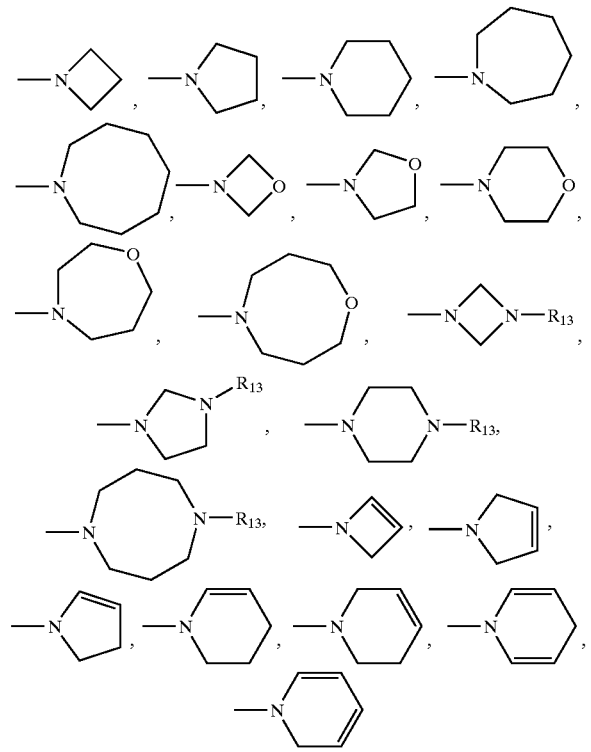

In the above formulae, $R_{13}$ represents the same group with $R_{12}$ described later, and the preferred groups are also the same as $R_{12}$.

In the general formula (IV), when $R_{10}$ and/or $R_{11}$ form(s) a ring condensed with the benzene ring G, i.e., case (3), the size of the ring is preferably a 5- or 6-membered ring, particularly preferably a 6-membered ring. Further, a saturated ring is preferred to an unsaturated ring. Specifically, the following structures may be exemplified.

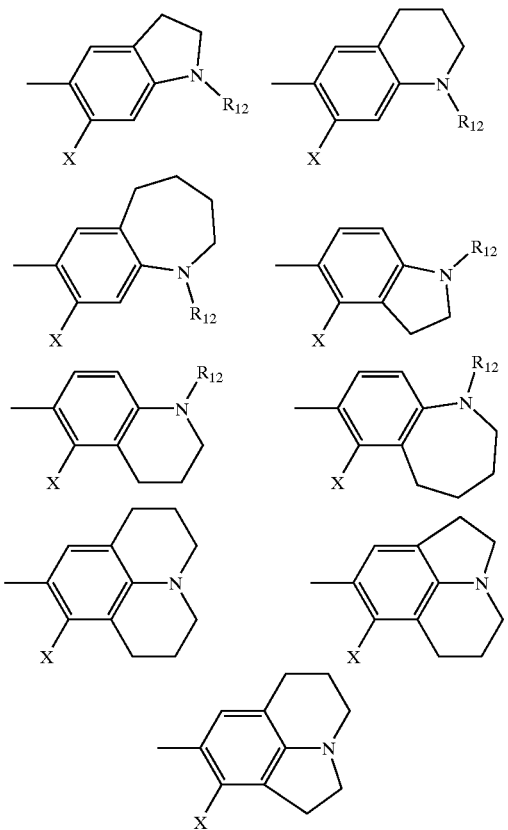

Substituent $R_{12}$ on a nitrogen atom represents a hydrogen atom, a straight chain or branched alkyl group having from 1 to 6 carbon atoms which may have substituent(s) (e.g., methyl, ethyl, n-propyl, isopropyl, n-butyl, sec-butyl, tert-butyl, n-pentyl, n-hexyl), or an aryl group having from 6 to 18 carbon atoms which may have substituent(s) (e.g., phenyl, tolyl, xylyl, naphthyl), preferably a straight chain or branched alkyl group having from 1 to 6 carbon atoms.

These alkyl and aryl groups may have substituent(s) such as an alkoxyl group having from 1 to 6 carbon atoms (e.g., methoxy, ethoxy, n-propoxy, isopropoxy, n-butoxy, sec-butoxy, tert-butoxy, n-pentyloxy, n-hexyloxy), an alkoxyalkoxy group having from 2 to 12 carbon atoms (e.g., methoxymethoxy, ethoxymethoxy, propoxymethoxy, methoxyethoxy, ethoxyethoxy, propoxyethoxy, methoxypropoxy, ethoxypropoxy, methoxybutoxy, ethoxybutoxy), an alkoxyalkoxyalkoxy group having from 3 to 15 carbon atoms (e.g., methoxymethoxymethoxy, methoxymethoxyethoxy, methoxyethoxymethoxy, methoxyethoxyethoxy, ethoxymethoxymethoxy, ethoxymethoxyethoxy, ethoxyethoxymethoxy, ethoxyethoxyethoxy), an allyloxy group, an aryl group having from 6 to 18 carbon atoms (e.g., phenyl, tolyl, xylyl, naphthyl), an aryloxy group from 6 to 18 carbon atoms (e.g., phenoxy, tolyloxy, xylyloxy, naphthyloxy), a cyano group, a nitro group, a hydroxyl group, a tetrahydrofuryl group, an alkylamino group having from 1 to 6 carbon atoms (e.g., methylamino, ethylamino, n-propylamino, n-butylamino), a dialkylamino group having from 2 to 12 carbon atoms (e.g., dimethylamino, diethylamino, di-n-propylamino, di-n- butylamino), an alkylsulfonylamino group having from 1 to 6 carbon atoms (e.g., methylsulfonylamino, ethylsulfonylamino, n-propylsulfonylamino, isopropylsulfonylamino, n-butylsulfonylamino, sec-butylsulfonylamino, tert-butylsulfonylamino, n-pentylsulfonylamino, n-hexylsulfonylamino), a halogen atom (e.g., fluorine, chlorine, bromine, iodine), an alkoxycarbonyl group having from 2 to 7 carbon atoms (e.g., methoxycarbonyl, ethoxycarbonyl, n-propoxycarbonyl, isopropoxycarbonyl, n-butoxycarbonyl, sec-butoxycarbonyl, tert-butoxycarbonyl, n-pentyloxycarbonyl, n-hexyloxycarbonyl), or an alkylcarbonyloxy group having from 2 to 7 carbon atoms (e.g., methylcarbonyloxy, ethylcarbonyloxy, n-propylcarbonyloxy, isopropylcarbonyloxy, n-butylcarbonyloxy, sec-butylcarbonyloxy, tert-butylcarbonyloxy, n-pentylcarbonyloxy, n-hexylcarbonyloxy).

Particularly preferable $R_{12}$ is an unsubstituted straight chain or branched alkyl group, or an alkyl group substituted with halogen atom(s) or alkenyl group(s).

The examples of the substituents on ring B or ring D other than X and $R_{12}$ include a straight chain or branched alkyl group having from 1 to 6 carbon atoms (e.g., methyl, ethyl, n-propyl, isopropyl, n-butyl, sec-butyl, tert-butyl, n-pentyl, n-hexyl), a cyclic alkyl group having from 3 to 6 carbon atoms (e.g., cyclopropyl, cyclobutyl, cyclopentyl, cyclohexyl), an alkoxyl group having from 1 to 6 carbon atoms (e.g., methoxy, ethoxy, n-propoxy, isopropoxy, n-butoxy, sec-butoxy, tert-butoxy, n-pentyloxy, n-hexyloxy), an alkylcarbonyl group having from 1 to 7 carbon atoms (e.g., acetyl, propionyl, butyryl, isobutyryl, valeryl, isovaleryl, pivaloyl, hexanoyl, heptanoyl), a straight chain or branched alkenyl group having from 2 to 6 carbon atoms (e.g., vinyl, 1-propenyl, allyl, isopropenyl, 2-butenyl, 1,3-butadienyl, 1-pentenyl, 1-hexenyl), a cyclic alkenyl group having from 3 to 6 carbon atoms (e.g., cyclopentenyl, cyclohexenyl), a halogen atom (e.g., fluorine, chlorine, bromine, iodine), a formyl group, a hydroxyl group, a carboxyl group, a hydroxyalkyl group having from 1 to 6 carbon atoms (e.g., hydroxymethyl, hydroxyethyl), an alkoxycarbonyl group having from 2 to 7 carbon atoms (e.g., methoxycarbonyl, ethoxycarbonyl, n-propoxycarbonyl, isopropoxycarbonyl, n-butoxycarbonyl, sec-butoxycarbonyl, tert-butoxycarbonyl, n-pentyloxycarbonyl, n-hexyloxycarbonyl), a nitro group, a cyano group, an amino group, an alkylamino group having from 1 to 6 carbon atoms (e.g., methylamino, ethylamino, n-propylamino, n-butylamino), a dialkylamino group having from 2 to 12 carbon atoms (e.g., dimethylamino, diethylamino, di-n-propylamino, di-n-butylamino), an alkoxycarbonylalkyl group having from 3 to 7 carbon atoms (e.g., methoxycarbonylmethyl, ethoxycarbonylmethyl, n-propoxycarbonylmethyl, isopropoxycarbonylethyl), an alkylthio group having from 1 to 6 carbon atoms (e.g., methylthio, ethylthio, n-propylthio, sec-butylthio, tert-butylthio, n-pentylthio, n-hexylthio), an alkylsulfonyl group having from 1 to 6 carbon atoms (methylsulfonyl, ethylsulfonyl, n-propylsulfonyl, isopropylsulfonyl, n-butylsulfonyl, sec-butylsulfonyl, tert-butylsulfonyl, n-pentylsulfonyl, n-hexylsulfonyl), an aryl group having from 6 to 16 carbon atoms which may have substituent(s), and an arylcarbonyl group having from 7 to 17 carbon atoms which may have substituent(s).

Of these substituents on ring B or ring D, an unsubstituted straight chain or branched alkyl group and an alkyl group substituted with halogen atom(s) are particularly preferred.

The chelate dye according to the present invention comprises two or more azo compounds having different structures selected from an azo compound represented by the general formula (I) or (II) coordinated to one metal ion. It is preferred that at least either one ring structure of ring A or ring C or the ring structure of ring B or ring D of two or more azo compounds be different from each other. "The ring structure" means the skeletal ring in ring A to ring D, i.e., the ring directly bonded to the azo group (substituents are not included).

For example, a chelate dye:

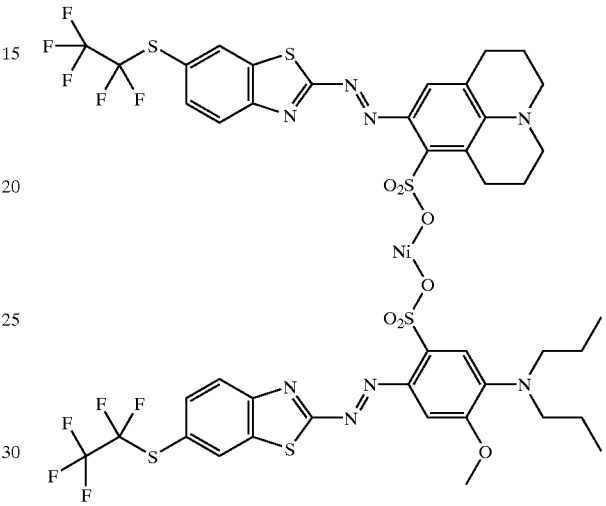

which is constituted by the compounds represented by the following two compounds (i) and (ii):

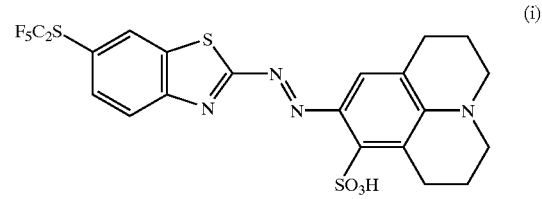

(i)

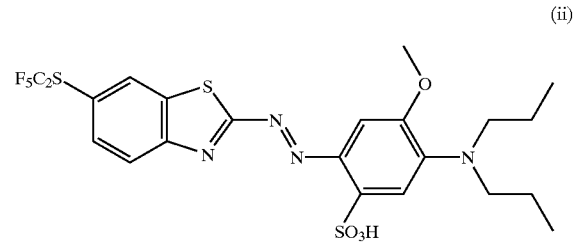

(ii)

and $Ni^{2+}$ is an example where the ring structures of ring B in two azo compounds in one molecule are different (a julolidine ring and a benzene ring).

That is, such a chelate dye means a dye in which two azo compounds in one molecule satisfy at least one of a combination of different ring structures A, a combination of different ring structures C, a combination of ring structure A and ring structure C, a combination of different ring structures B, a combination of different ring structures D, and a combination of ring structure B and ring structure D. The chelate dyes according to the a present invention may of course be those satisfying two or more of the above combinations.

The particularly preferred chelate dyes are chelate dyes having two or more azo compounds in one molecule each represented by the general formula (II) in which every ring C is a condensed ring containing thiazole, i.e., the azo compound represented by the general formula (III):

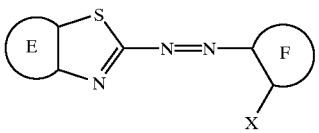
(III)

wherein ring E has the same meaning as in the above formula (V), ring F represents an aromatic hydrocarbon ring, or a condensed ring of an aromatic hydrocarbon ring with saturated ring(s), and these rings each may have substituent (s) other than X; and X represents a group having an active hydrogen (ring F in each azo compound may not have the same ring structure).

Ring E is preferably a 5- or 6-membered ring, most preferably a 6-membered ring, and ring E is preferably an aromatic hydrocarbon ring.

Ring F is specifically the ring structure represented by the above formula (IV).

The most preferred chelate dyes according to the present invention are chelate dyes in which two or more azo compounds in one molecule are each represented by structural formula (III) and every ring E is a benzene ring or a condensed ring of a benzene ring and saturated ring(s).

In the general formulae (I) and (II), X represents a group having active hydrogen, e.g., —SH, —SO$_2$H, —SO$_3$H, —NH$_2$, —NHR$_3$, —OH, —CO$_2$H, —B(OH)$_2$, —PO(OH)$_2$, —NHCOH, —NHCOR$_{13}$, and —NHSO$_2$R$_{13}$, preferably —SO$_3$H, —NH$_2$, —NHR$_{13}$, —OH, —CO$_2$H, —NHCOH, —NHCOR$_{13}$, and —NHSO$_2$R$_{13}$, and particularly preferably —SO$_3$H, —CO$_2$H, —OH, and —NHSO$_2$R$_{13}$, wherein R$_{13}$ represents a straight chain or branched alkyl group having from 1 to 6 carbon atoms which may have substituent(s) (e.g., methyl, ethyl, n-propyl, isopropyl, n-butyl, sec-butyl, tert-butyl, n-pentyl, n-hexyl), or a phenyl group which may have substituent(s) having from 6 to 12 carbon atoms (e.g., phenyl, tolyl, xylyl, naphthyl), and these groups may be substituted with halogen atom(s) (e.g., fluorine, chlorine, bromine, iodine).

The metal ions which constitute the chelate dyes according to the present invention are not particularly restricted as long as they are divalent or higher metal ions. "The metals" used herein means the metals positioned on the left side of the line connecting boron and astatine in the long form of the Periodic Table, i.e., group I exclusive of hydrogen (alkali metal and the copper group) and group II (alkaline earth metal and the zinc group), group III exclusive of boron, group IV exclusive of carbon and silicon, group VIII (the iron group and the platinum group), elements belonging to each subgroup a of groups V, VI and VII, antimony, bismuth and polonium (cf. *Rikagaku Jiten*, 3rd Ed., enlarged edition, p. 339, Iwanami Shoten Co., Ltd.). The preferred examples of these metals include Mg, Al, Ti, V, Cr, Mn, Fe, Co, Ni, Cu, Zn, Zr, Ru, Rh, Pd, In, Sn, Hf, Os, Pt and Hg, and Co, Ni, Cu and Pd are particularly preferred.

The specific examples of the chelate dyes according to the present invention are shown below, but the present invention is not limited thereto.

Further, in the following specific examples, for example, a chelate dye formed by the following two kinds of azo dyes:

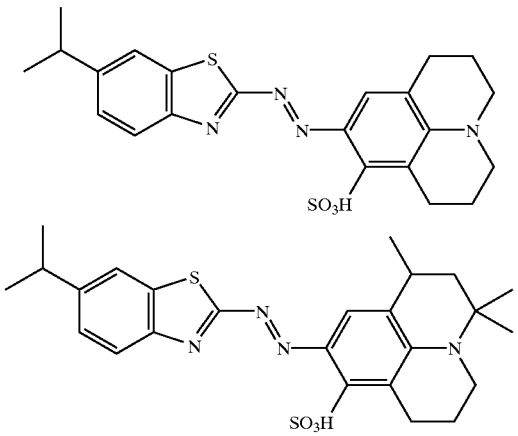

and Ni is presented as follows:

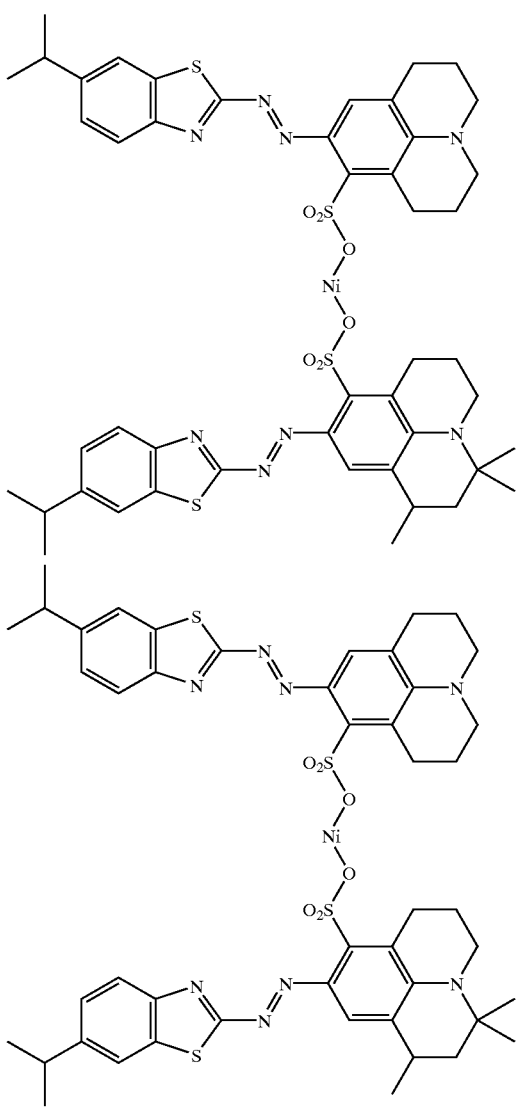

13
-continued
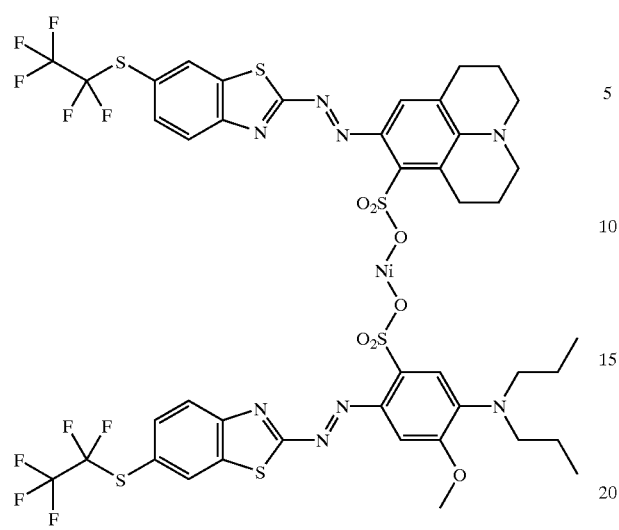
14
-continued
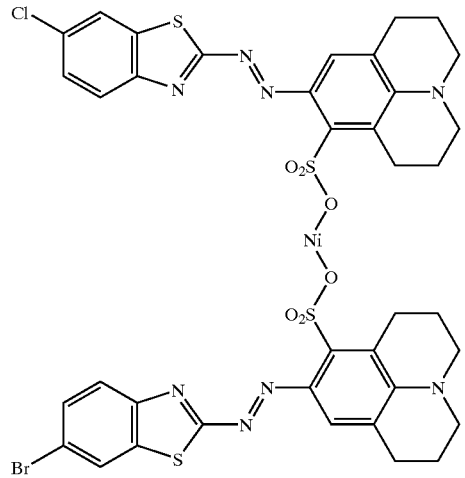
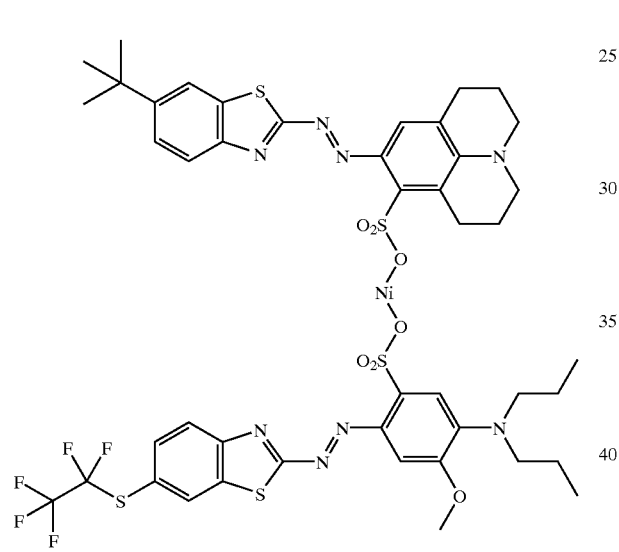
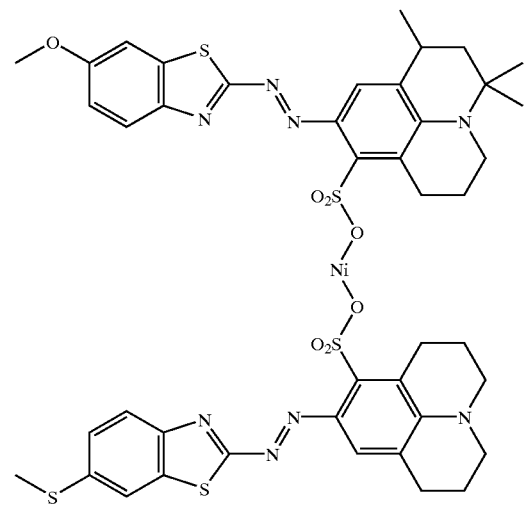
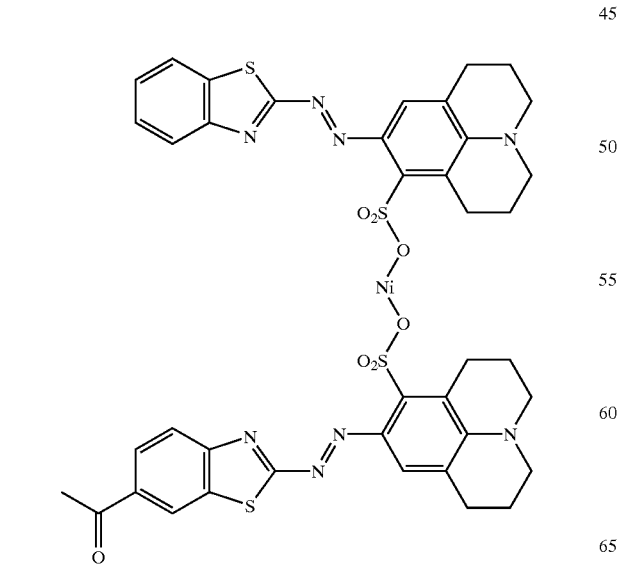
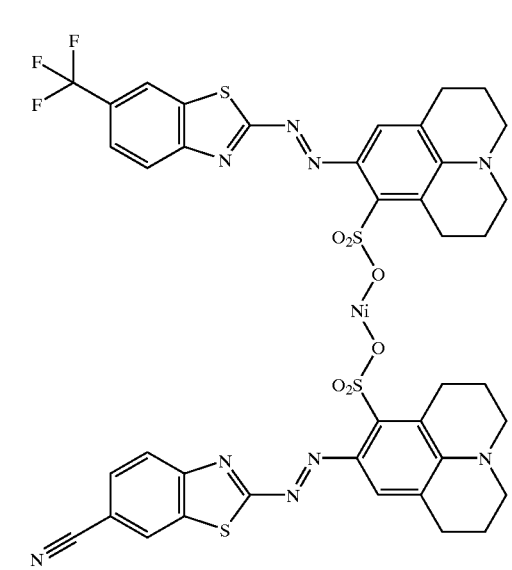

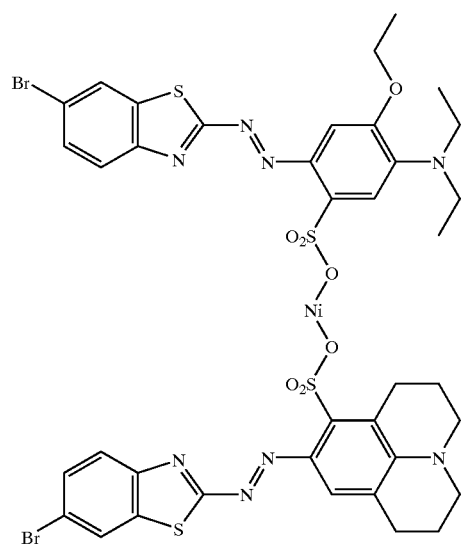
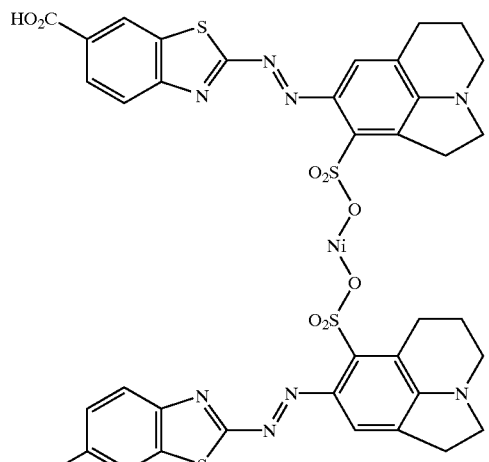
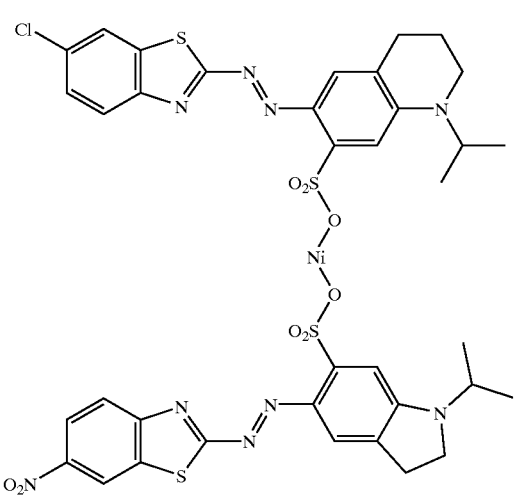
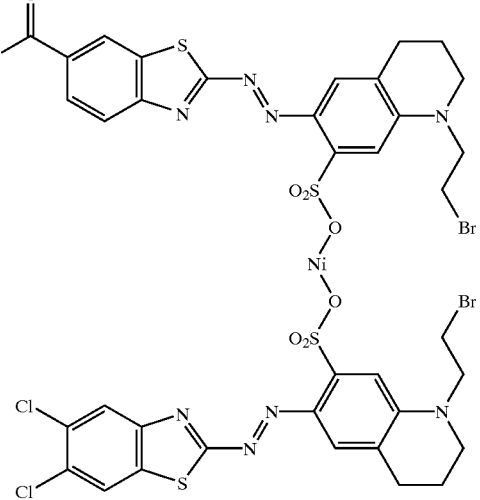
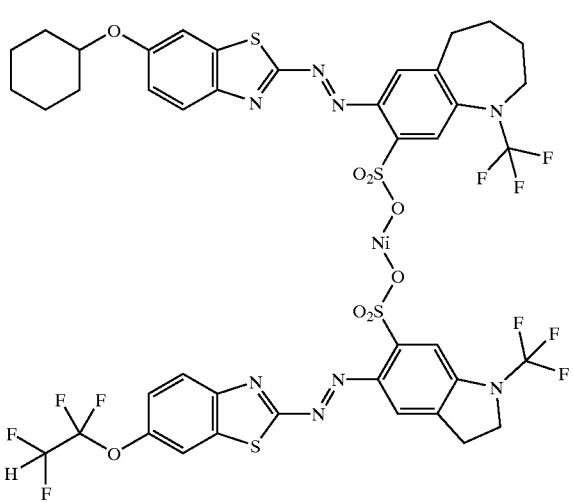
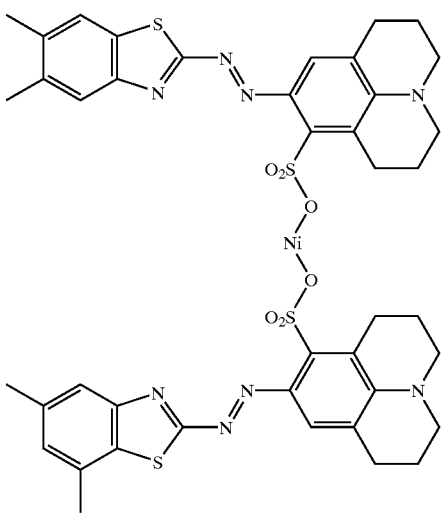

17
-continued
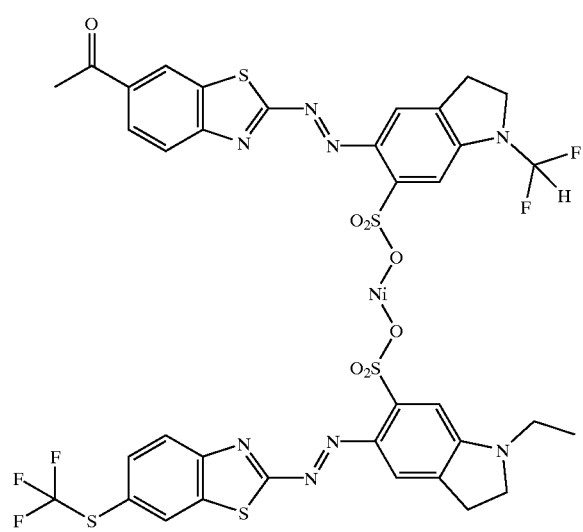
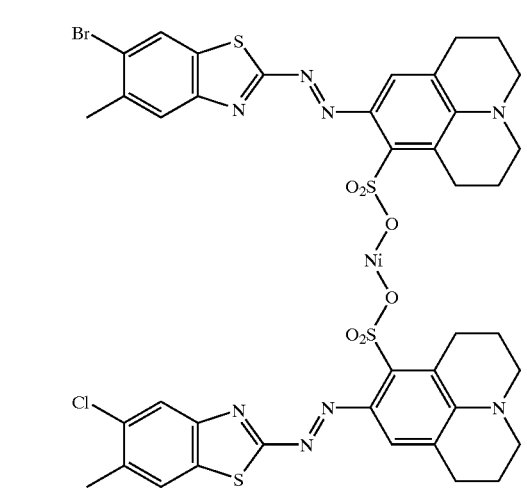
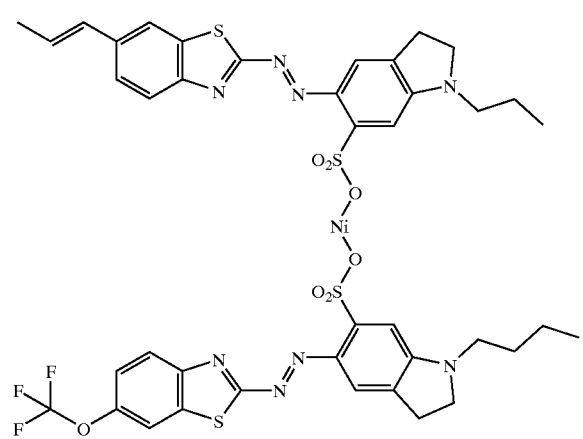
18
-continued
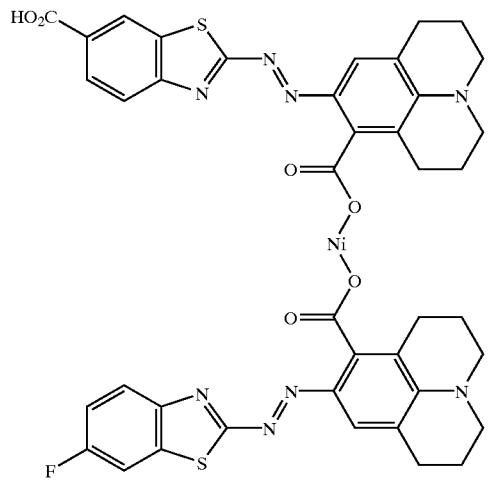
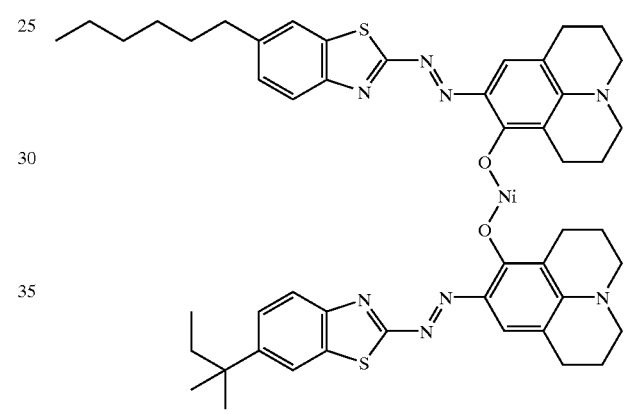
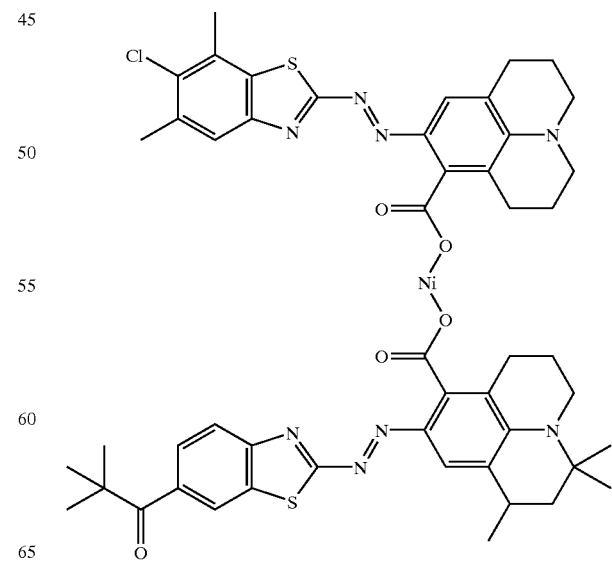

-continued
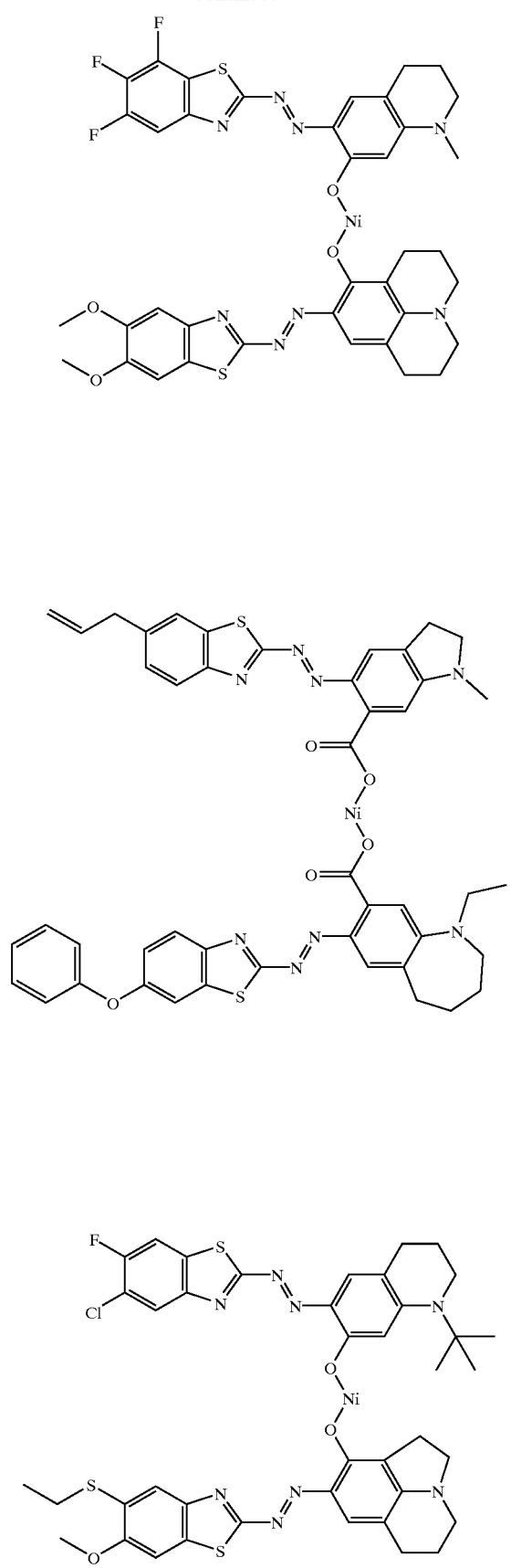
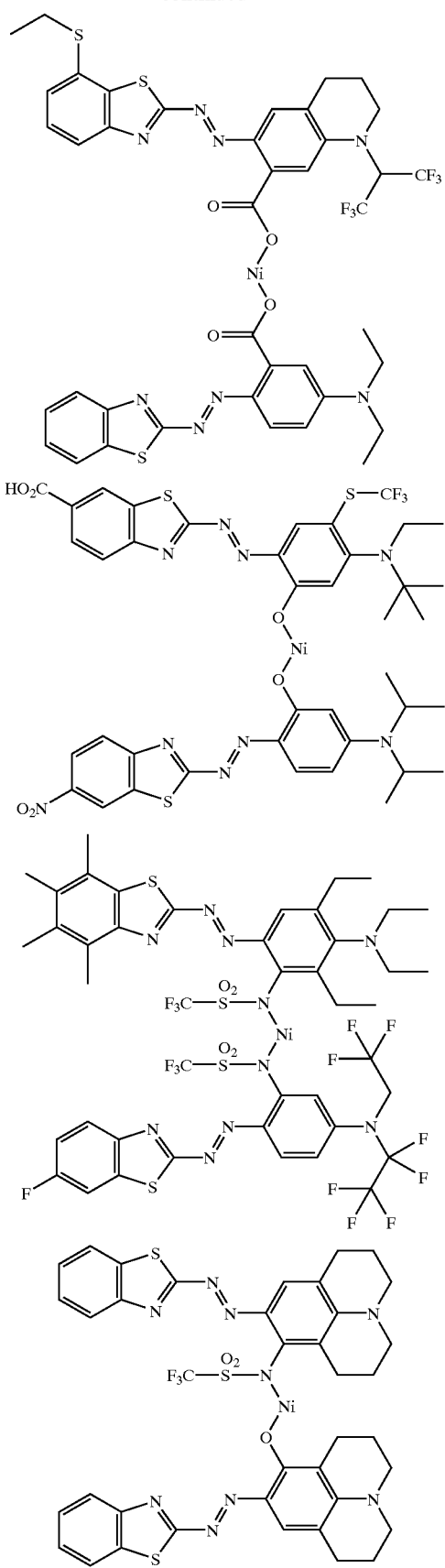

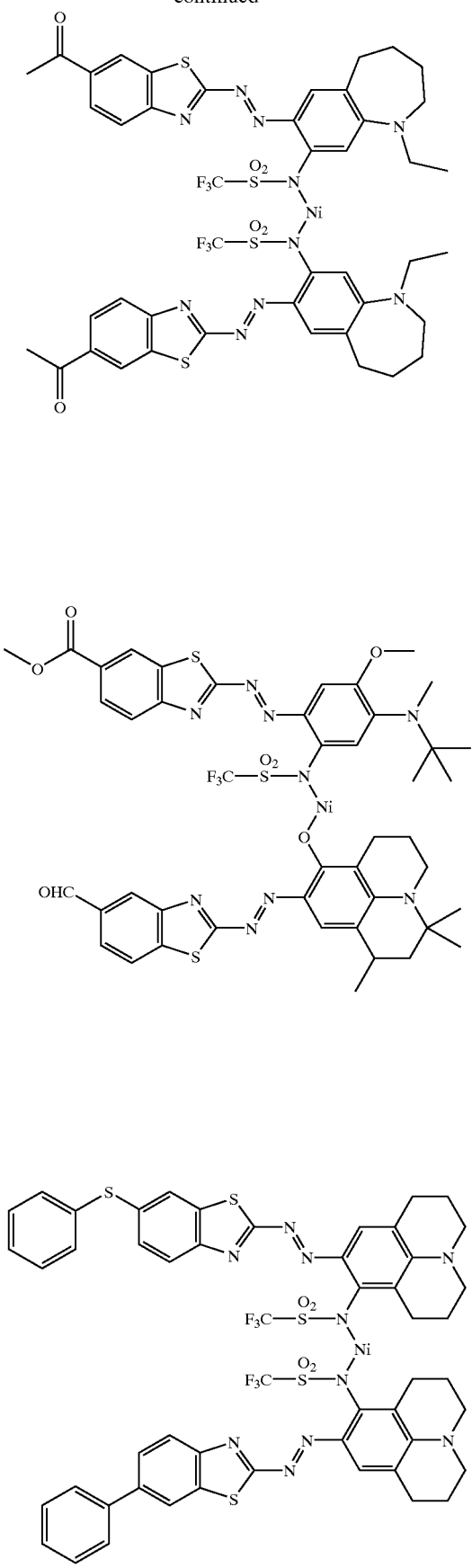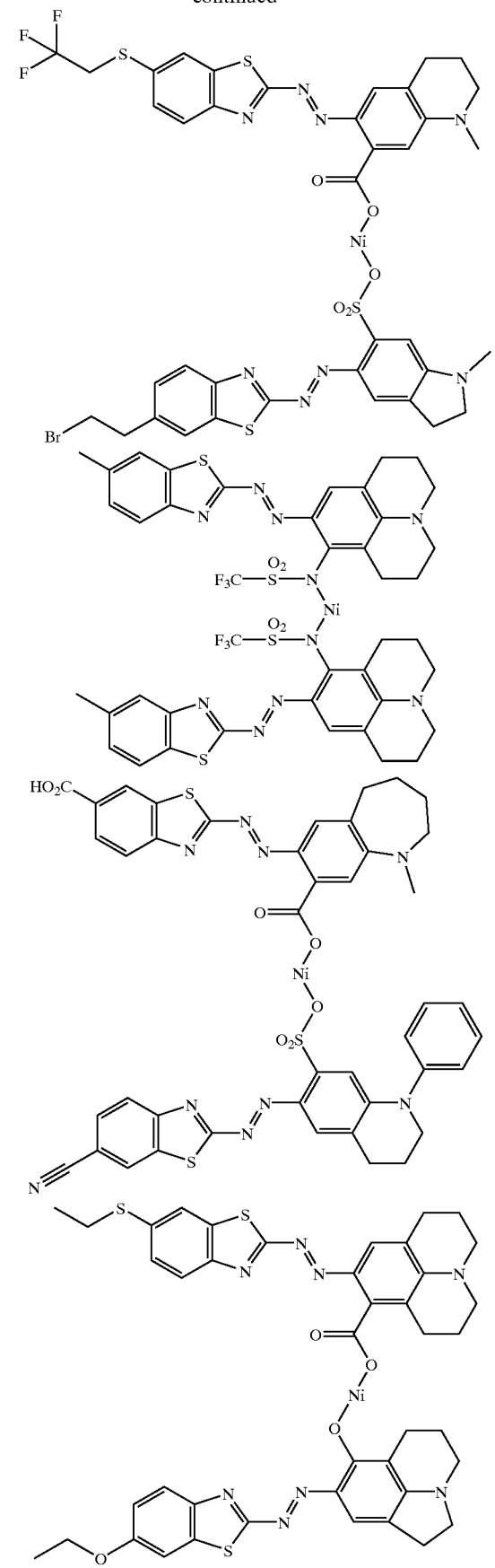

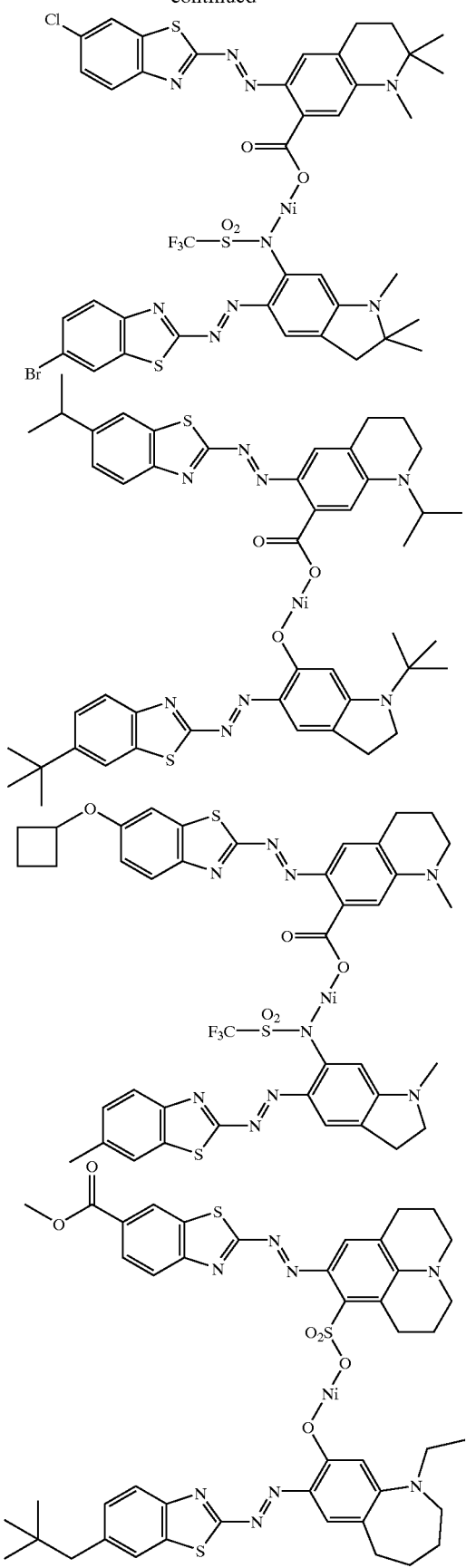
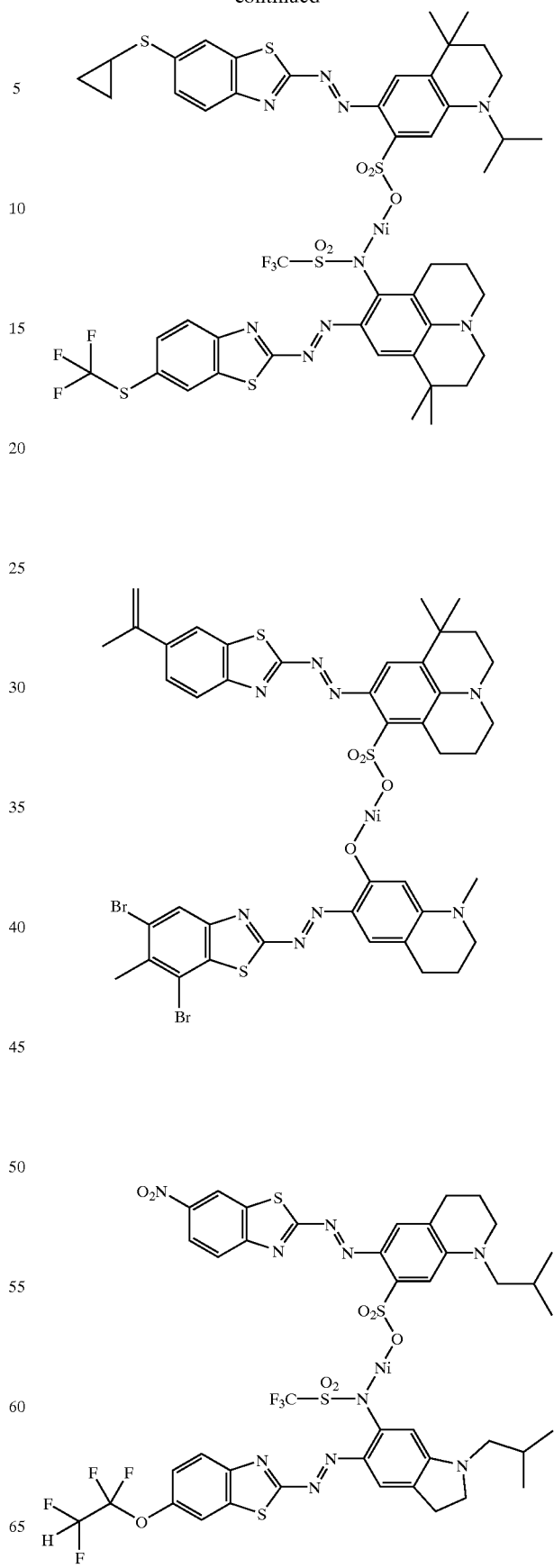

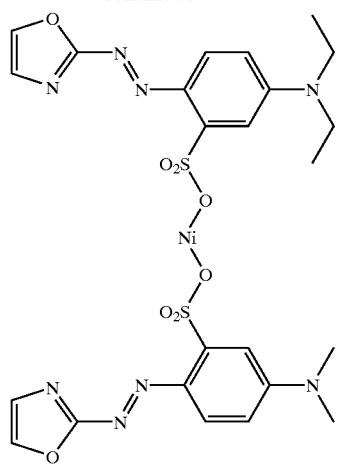
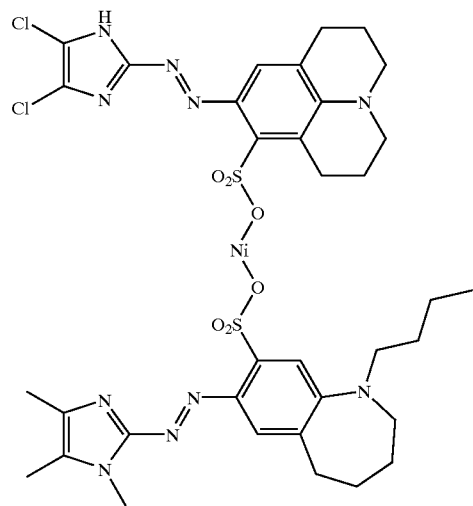
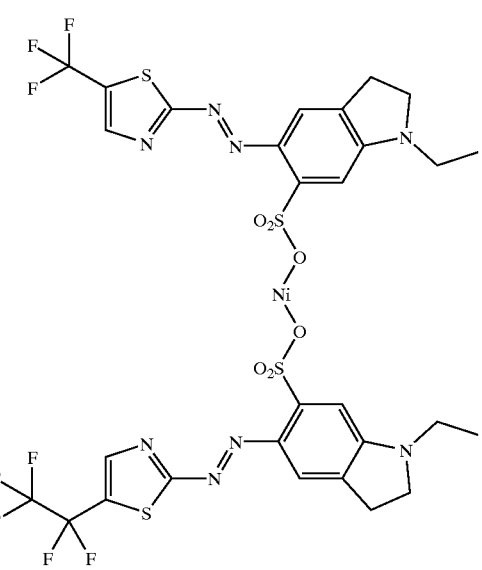
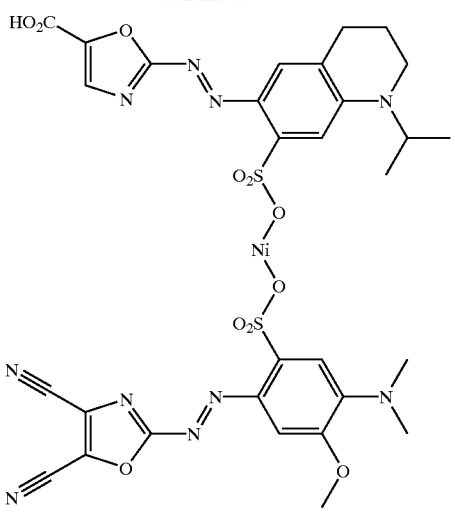
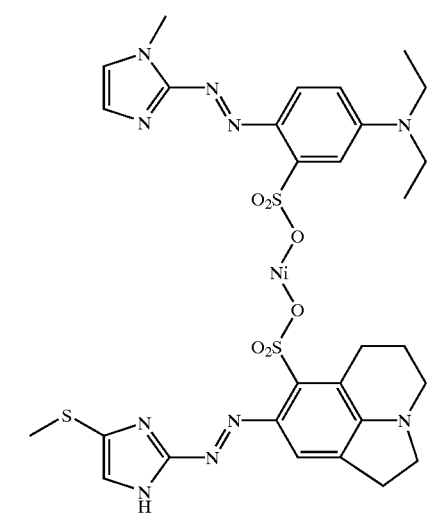
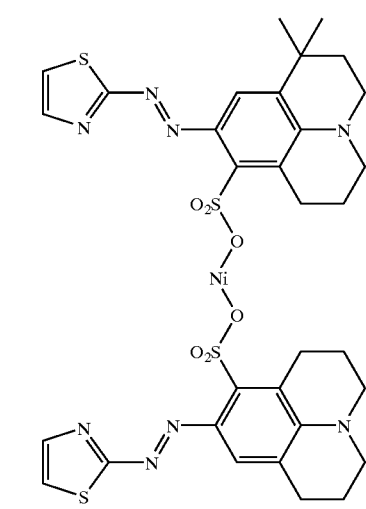

27
-continued
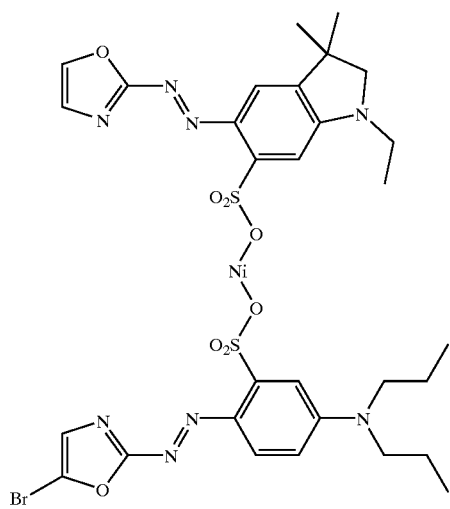
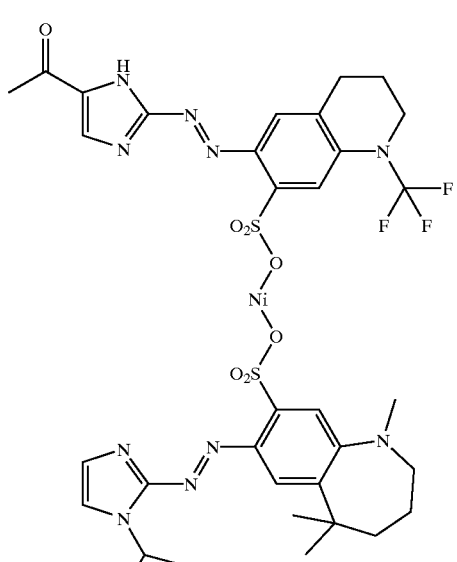
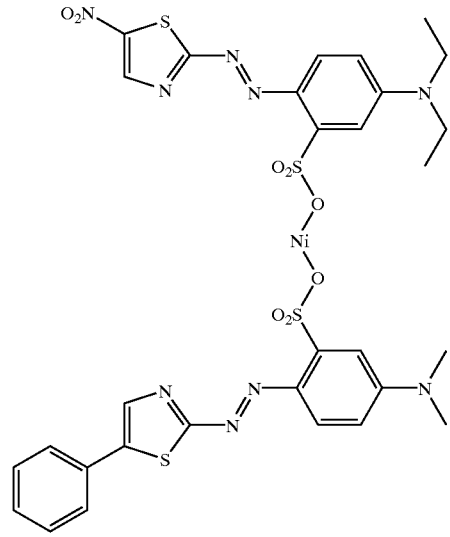
28
-continued
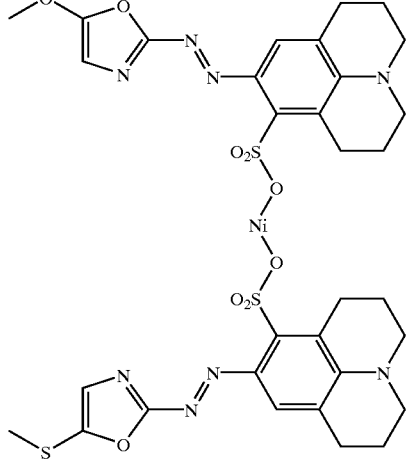
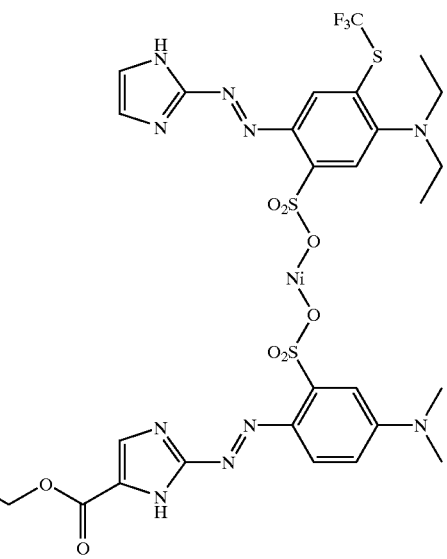
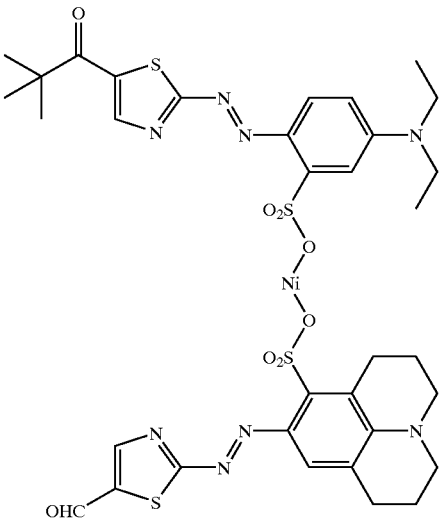

29
-continued
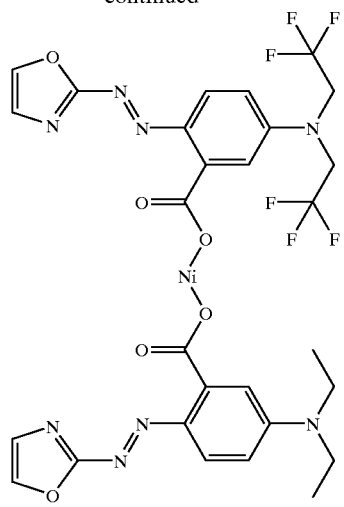
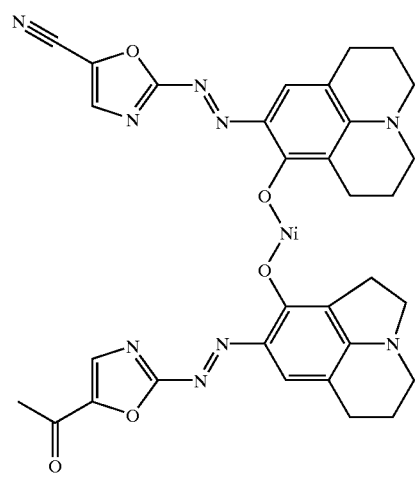
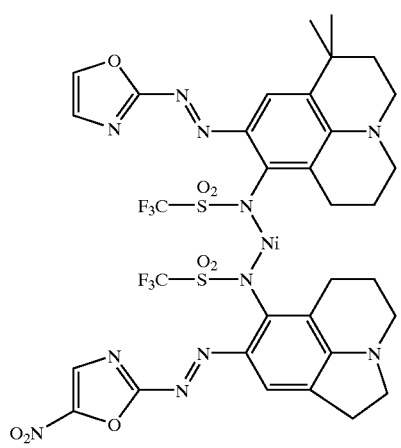
30
-continued
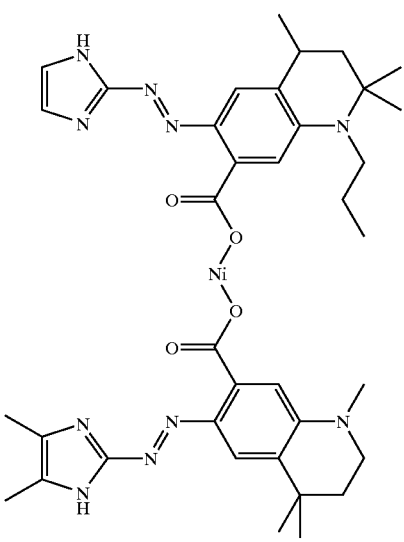
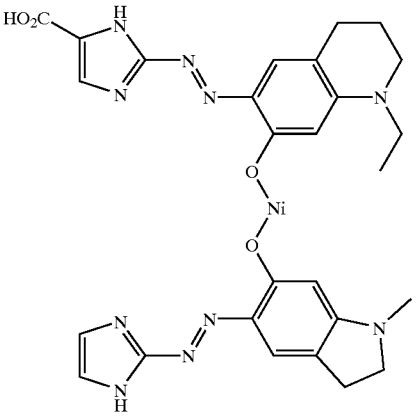
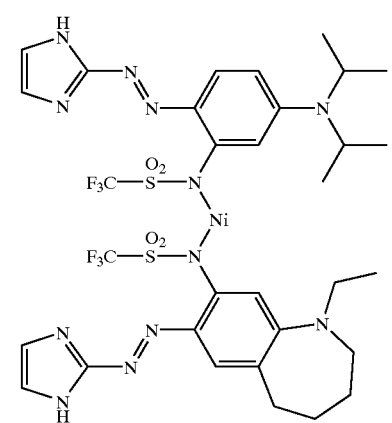

31
-continued
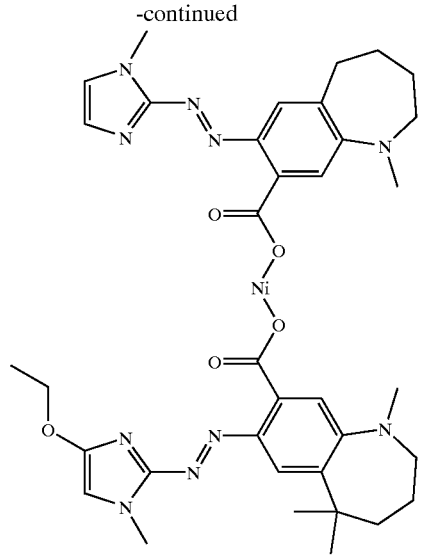
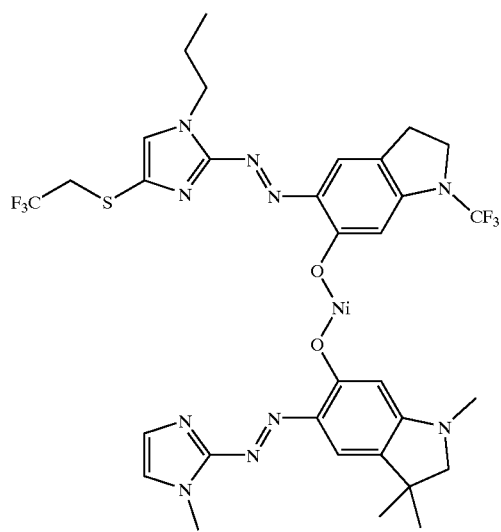
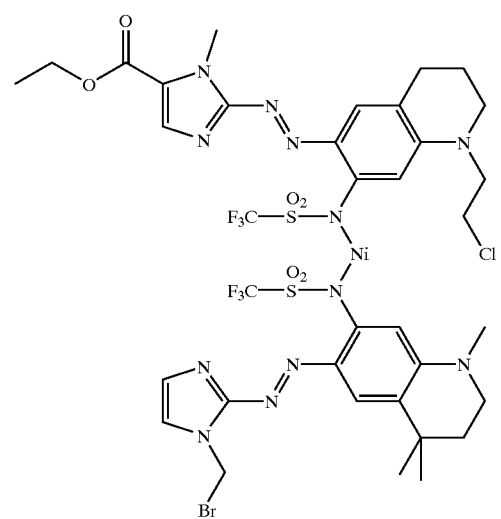
32
-continued
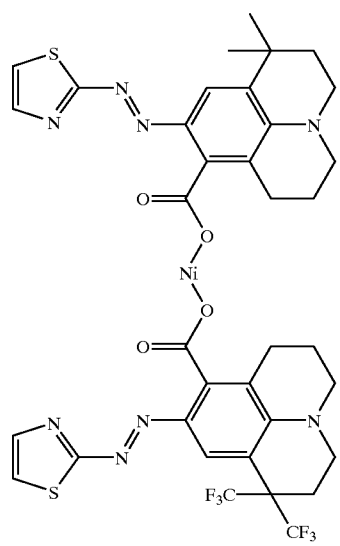
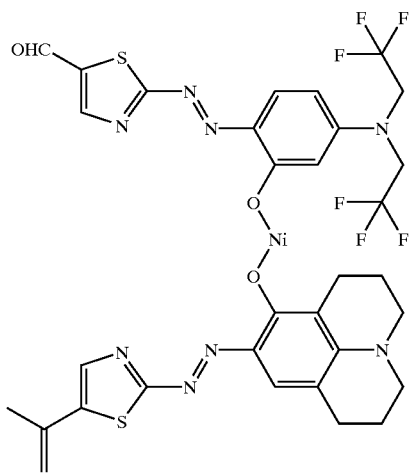
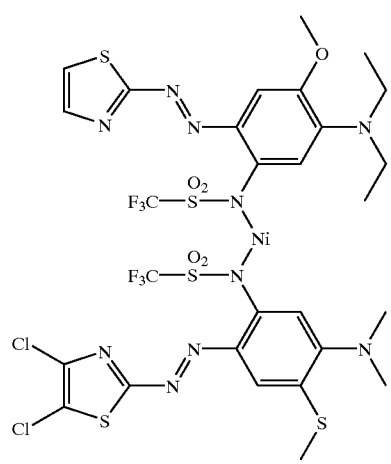

33
-continued
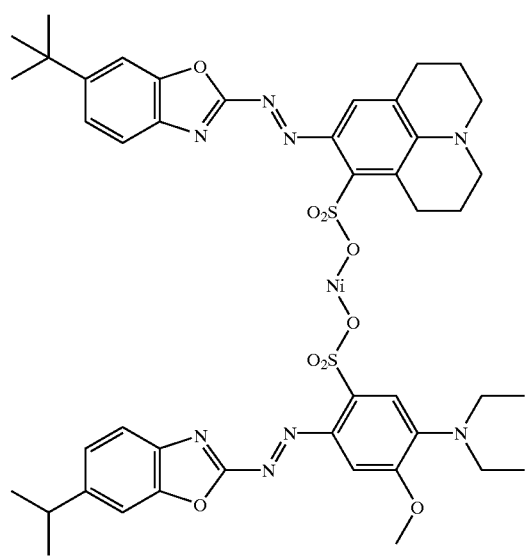
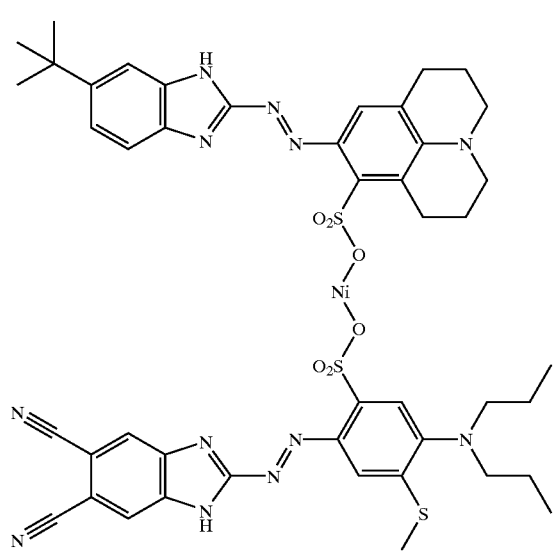
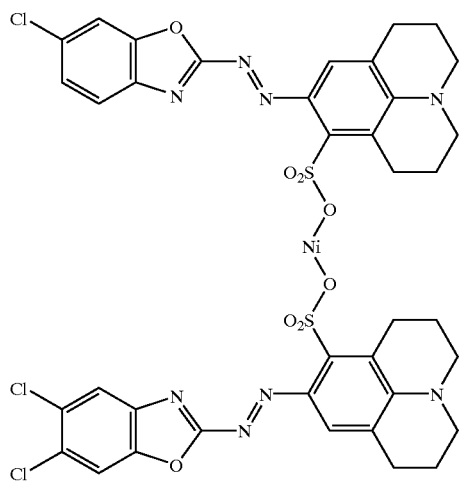
34
-continued
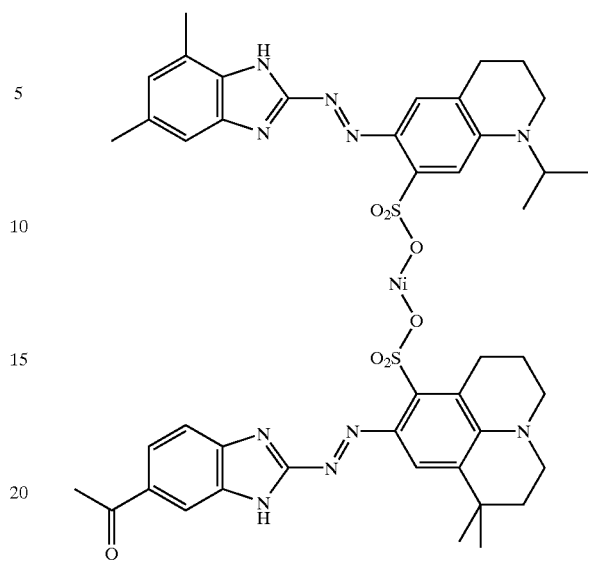
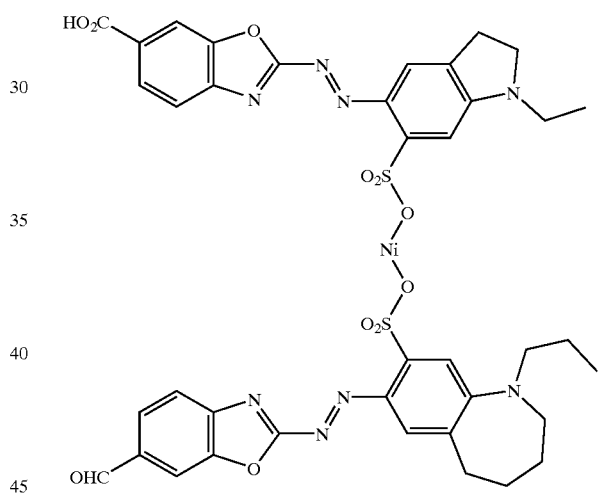
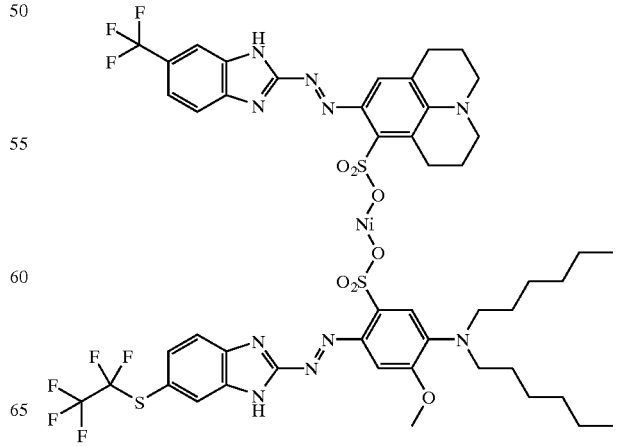

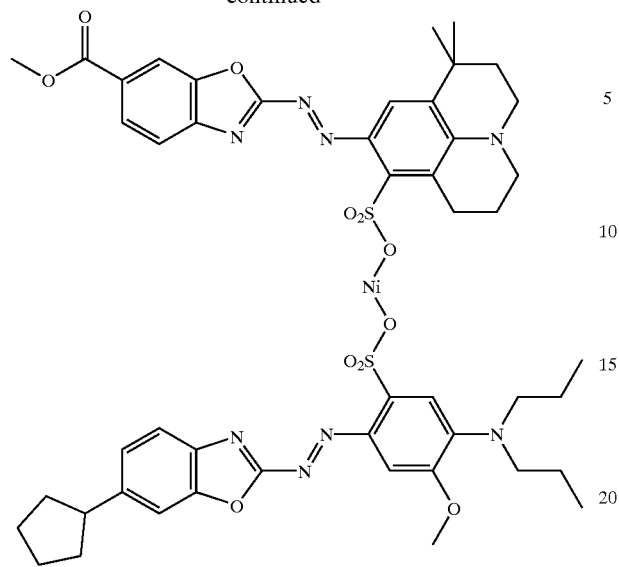
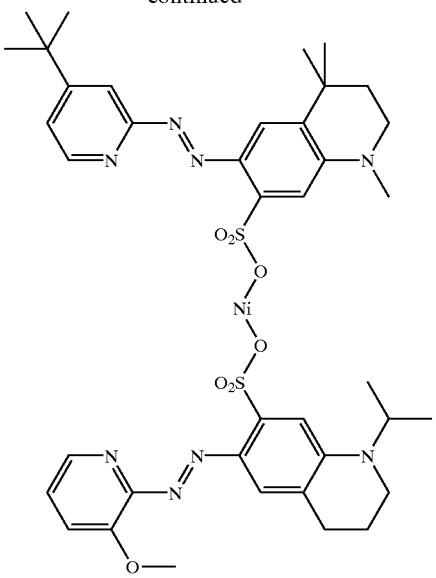
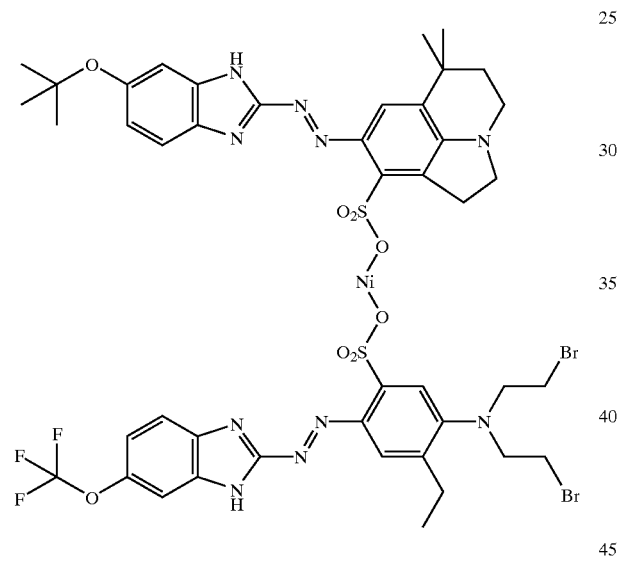
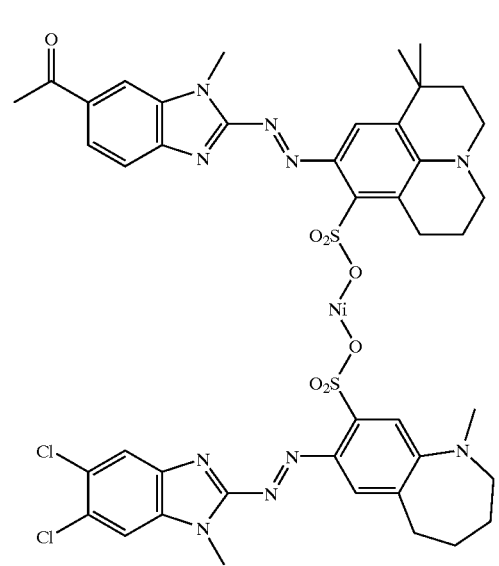
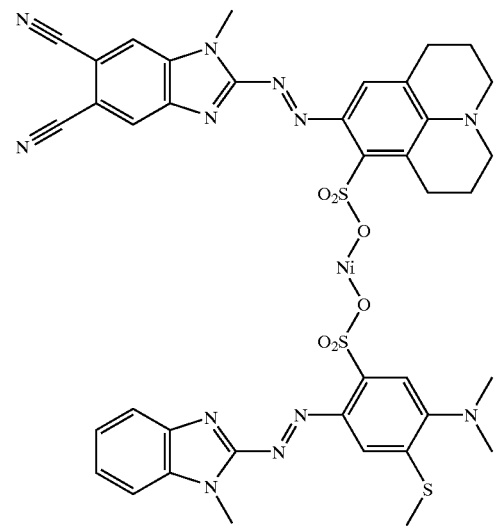
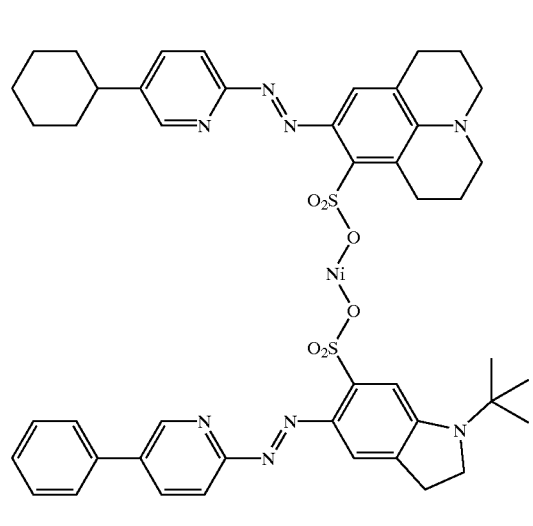

37
-continued
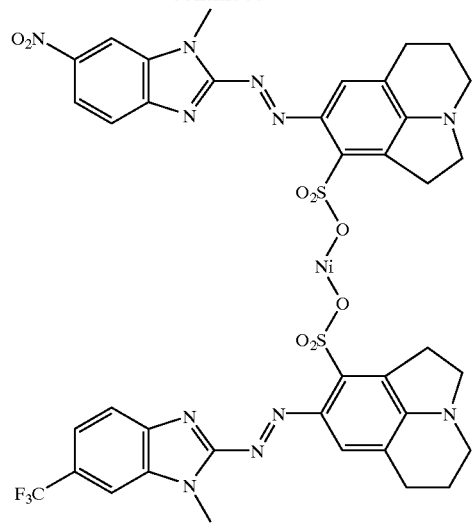
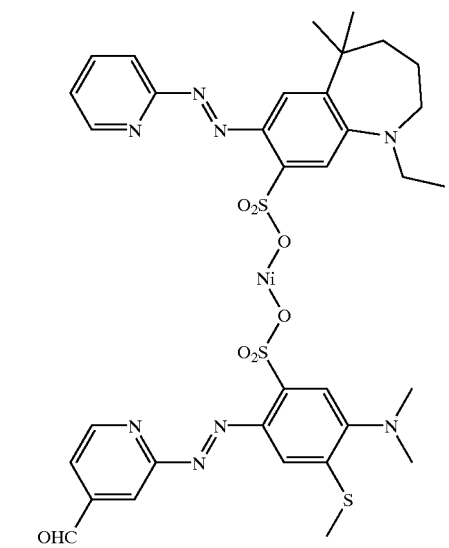
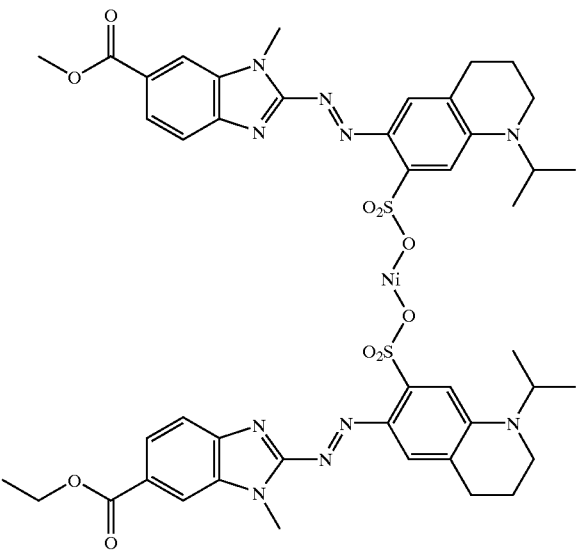
38
-continued
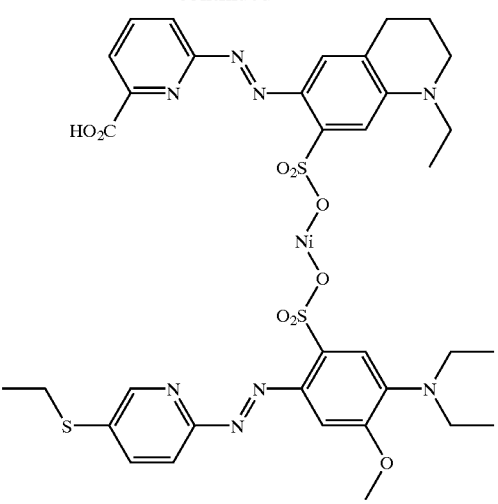
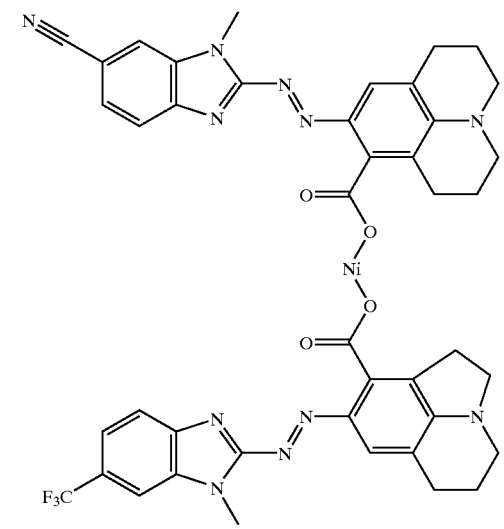
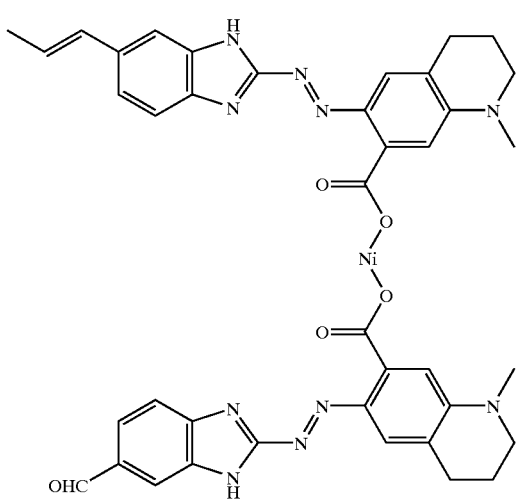

-continued
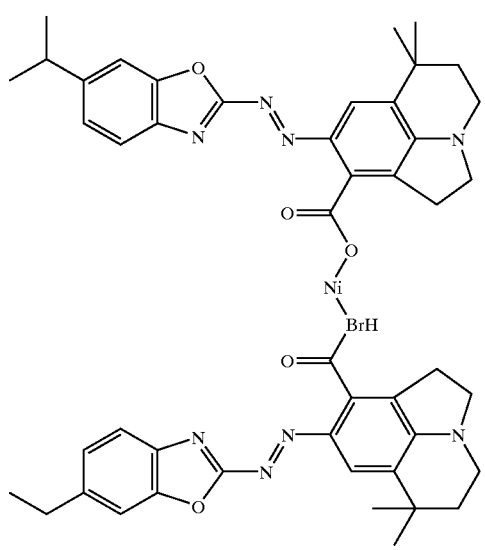
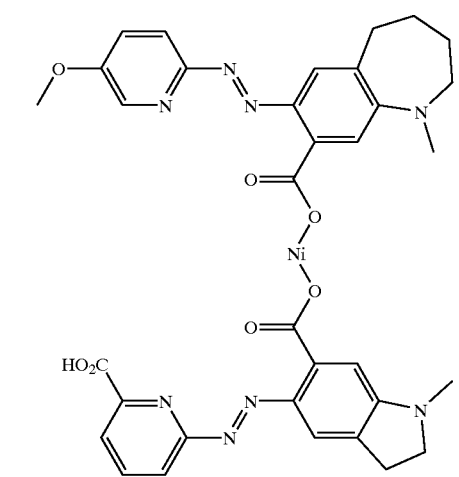
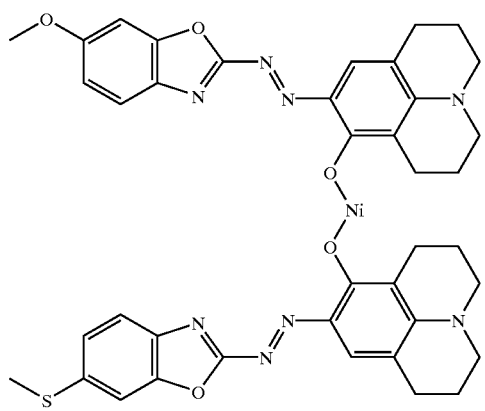
-continued
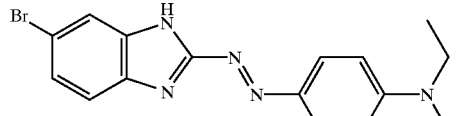
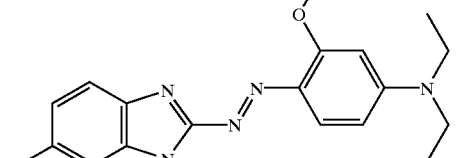
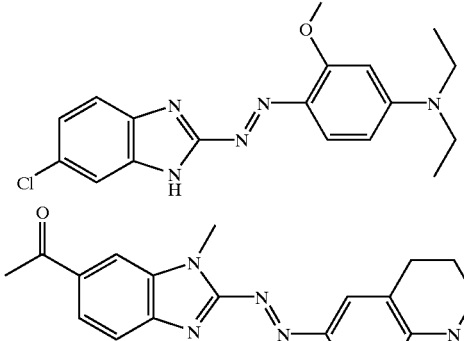
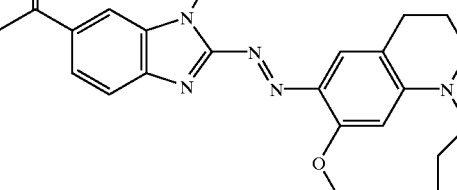
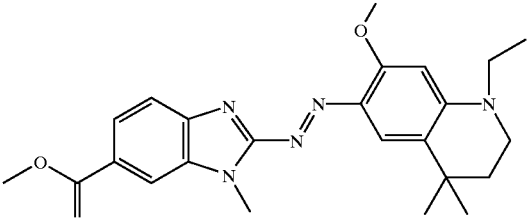
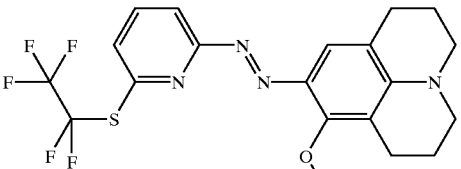
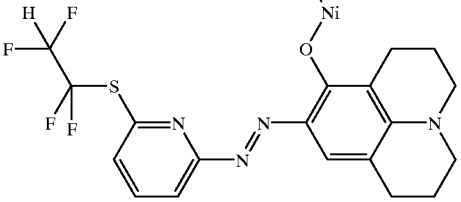
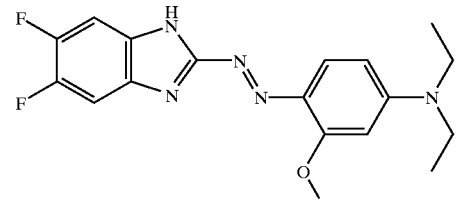
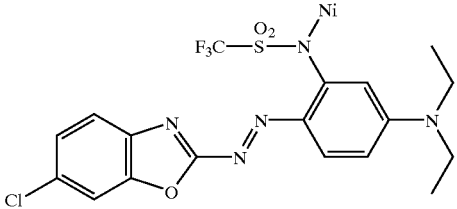

41
-continued
42
-continued
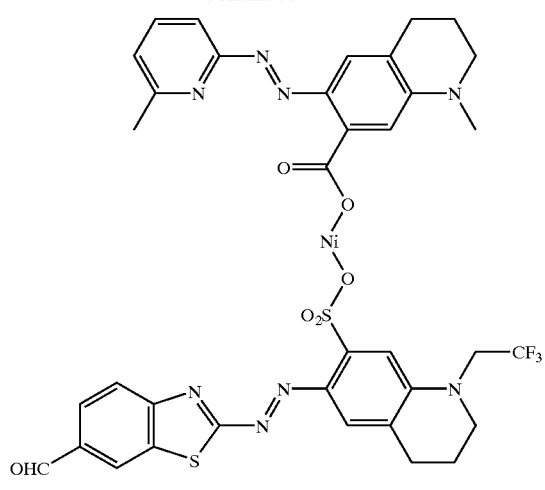
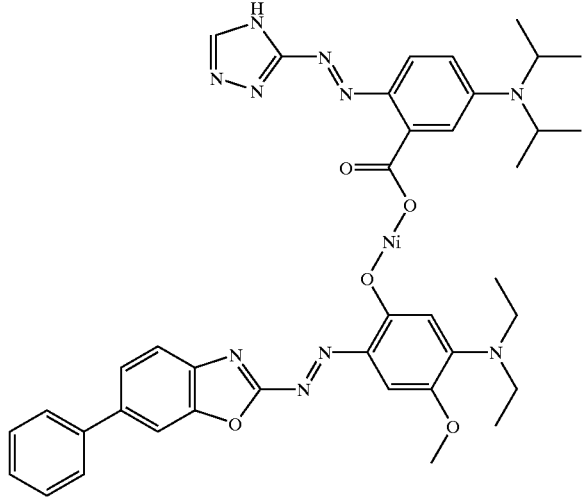
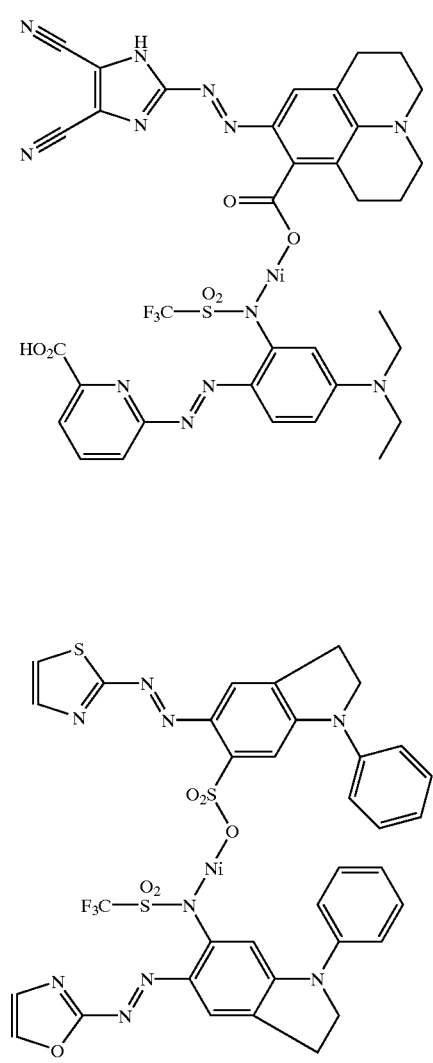

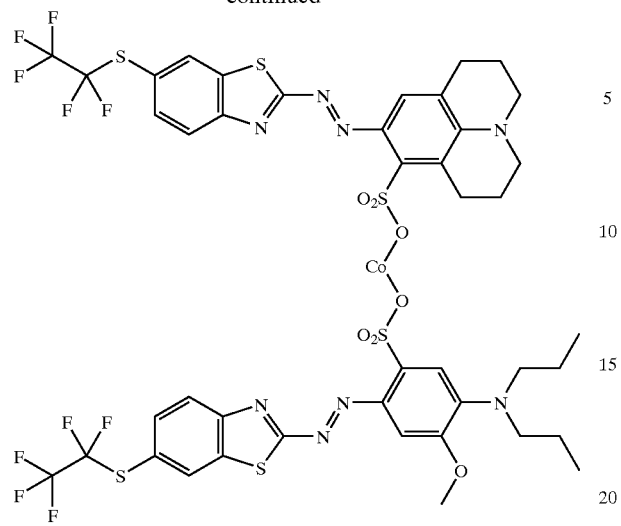
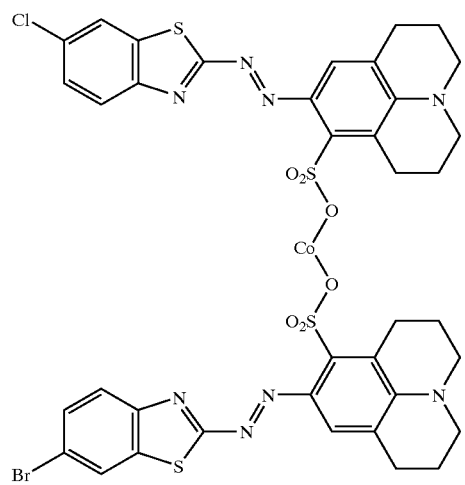
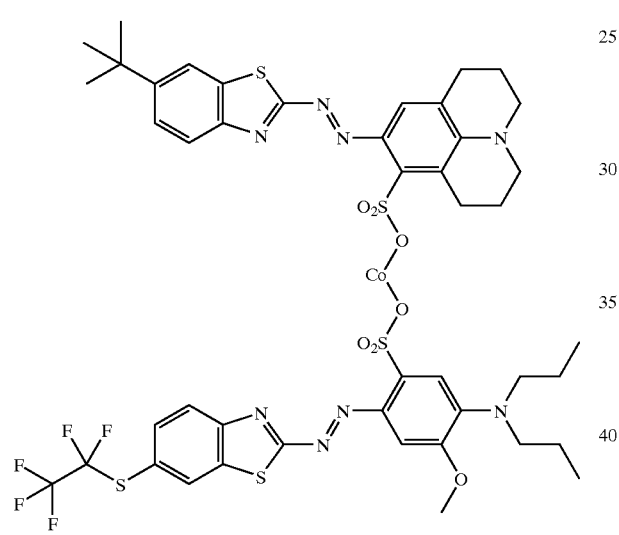
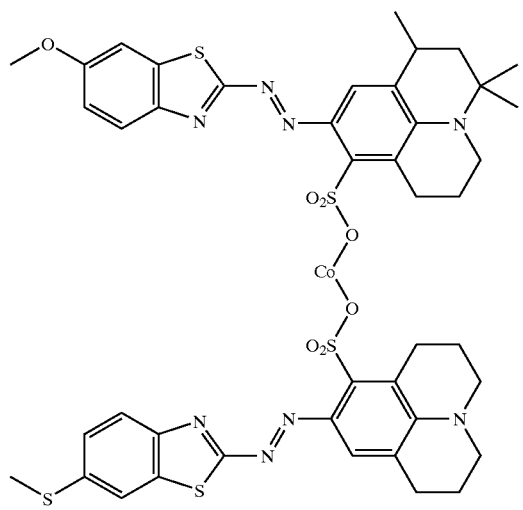
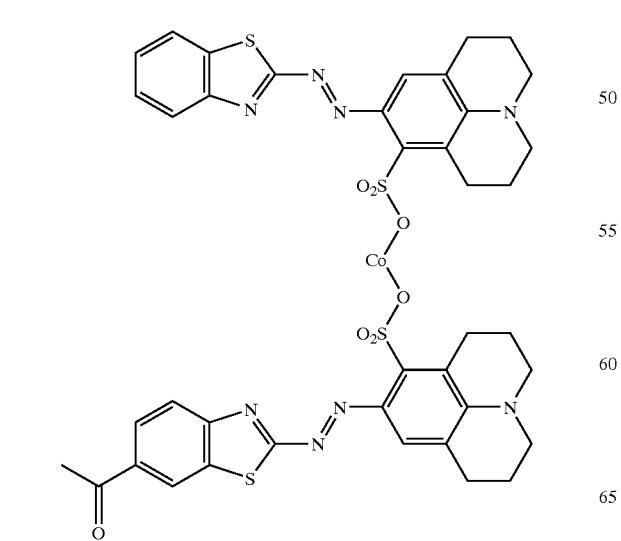
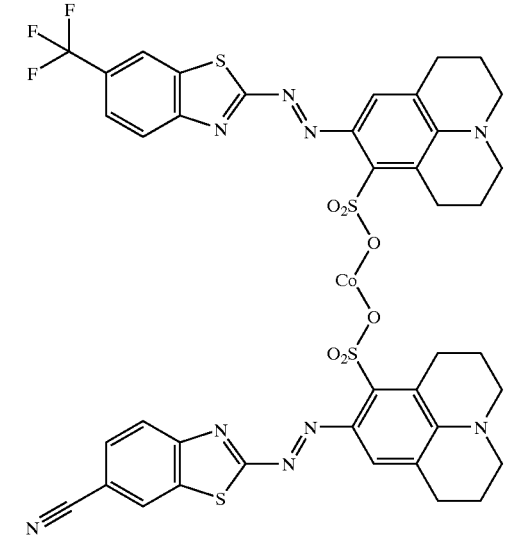

45
-continued
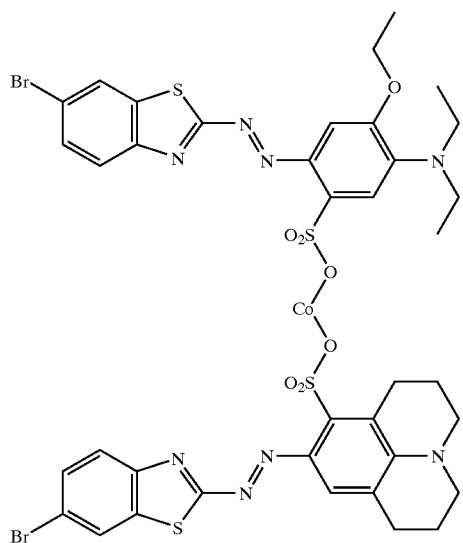
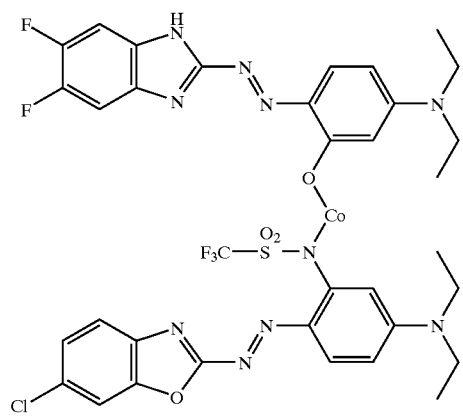
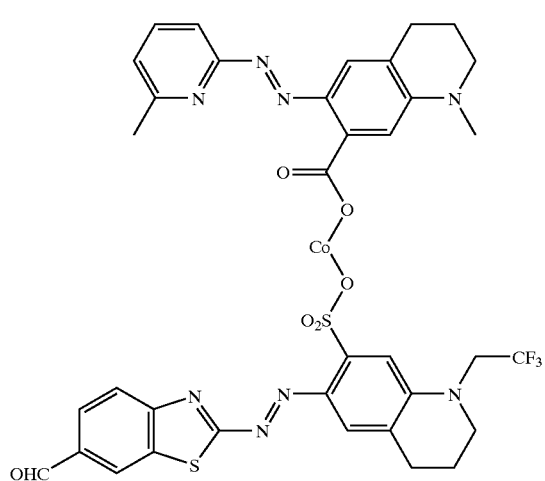
46
-continued
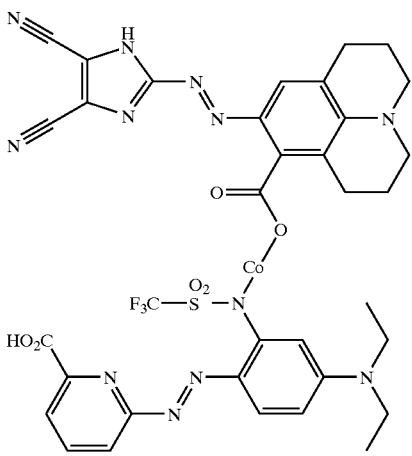
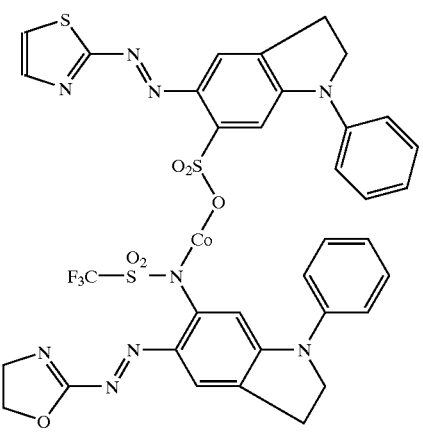
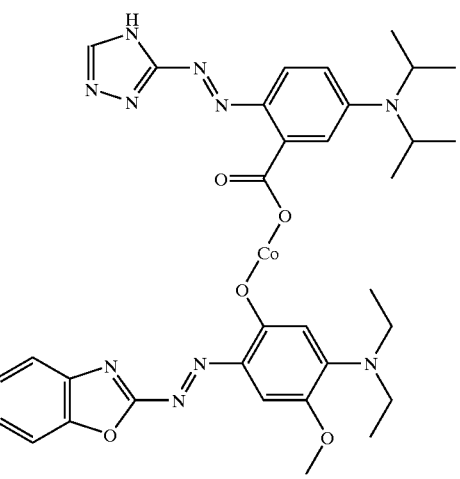

47
-continued
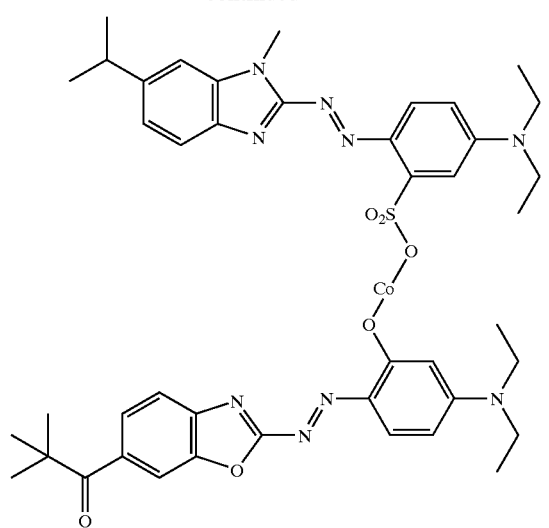
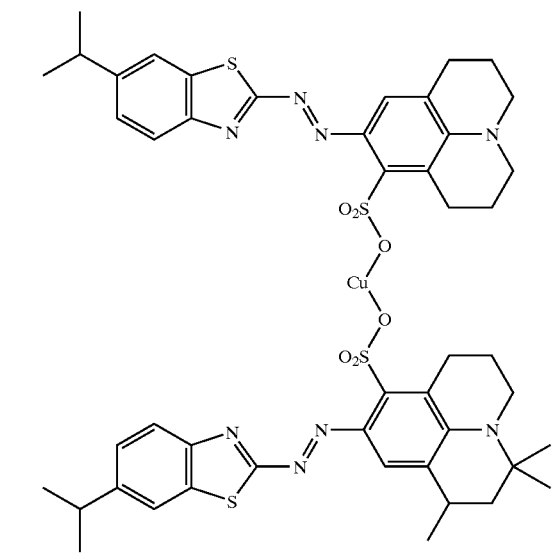
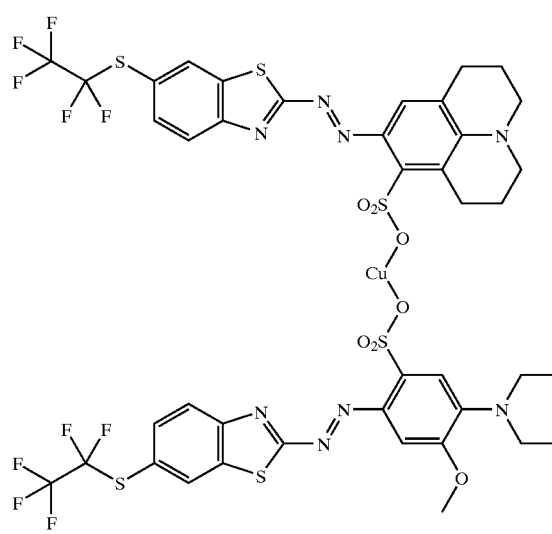
48
-continued
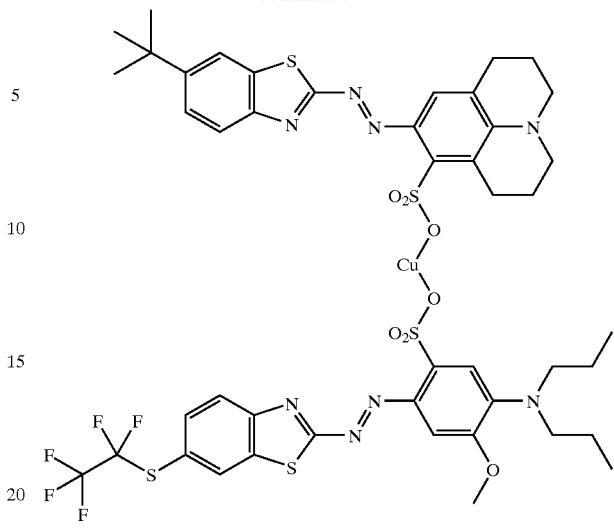
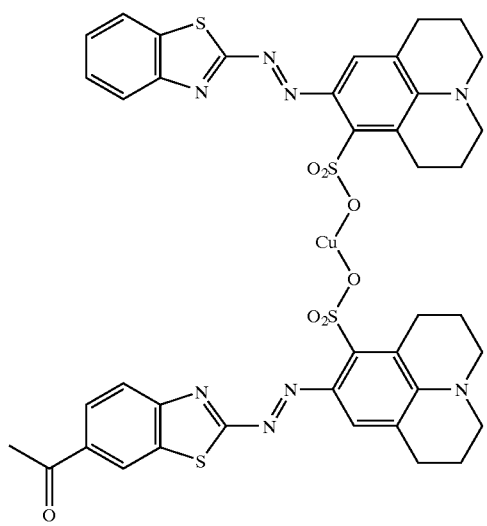
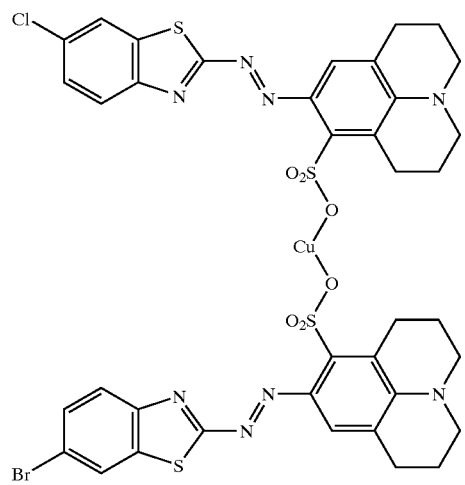

49
-continued
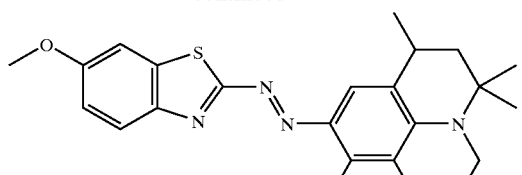
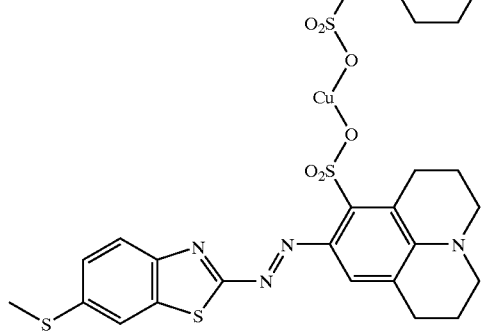
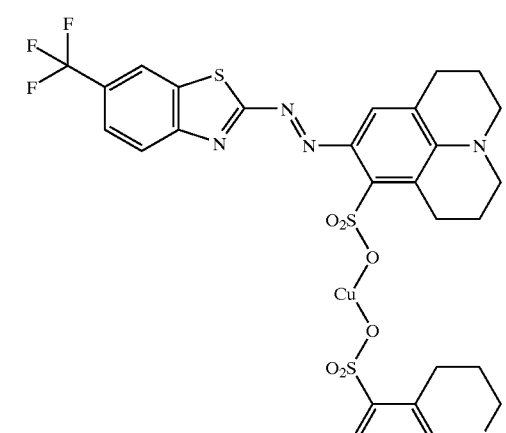
50
-continued
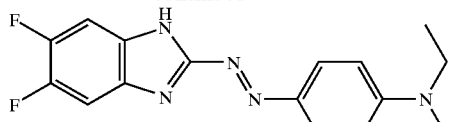
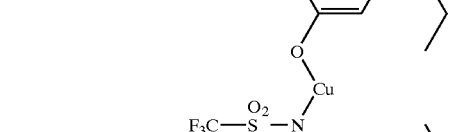
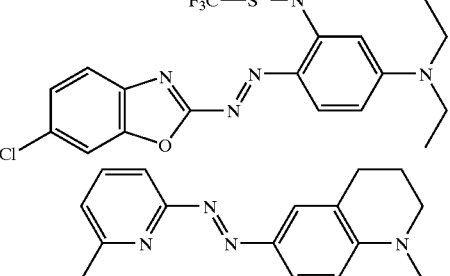
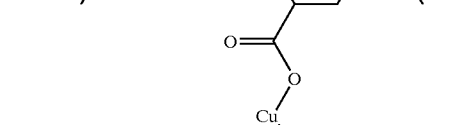
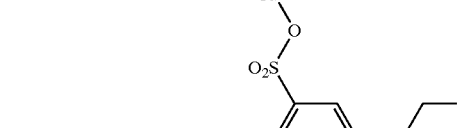
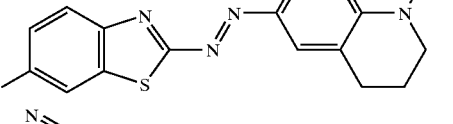
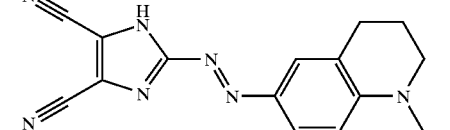
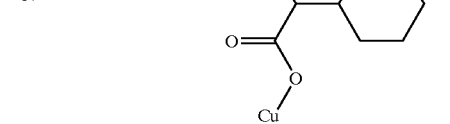
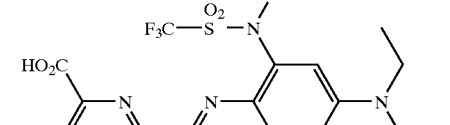
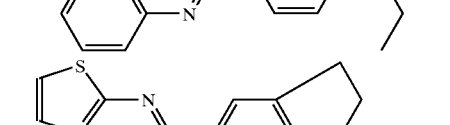
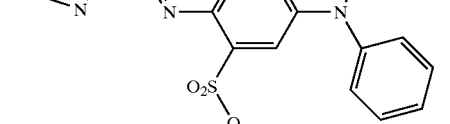
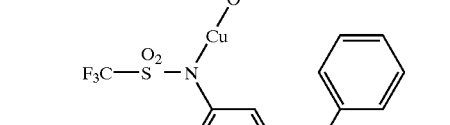
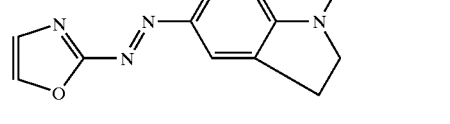

51
-continued
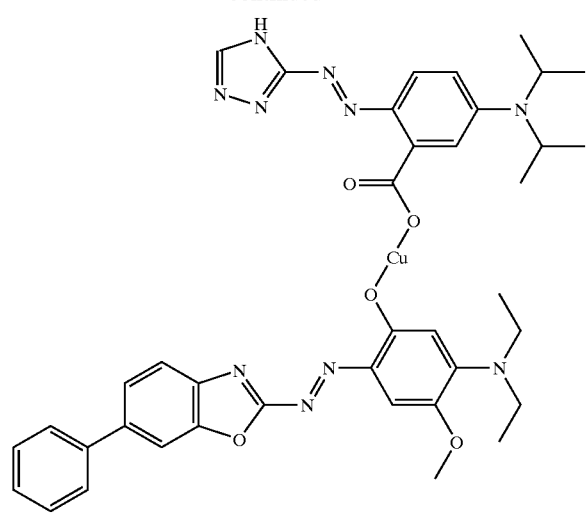
52
-continued
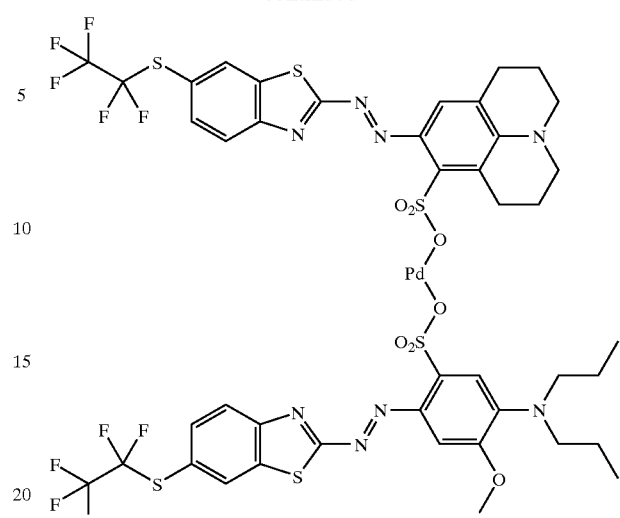
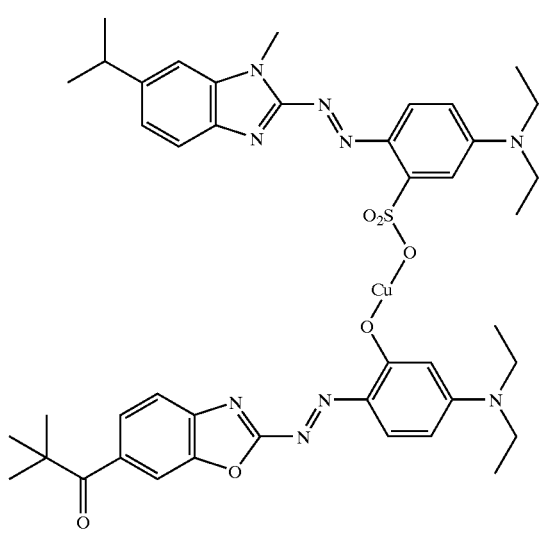
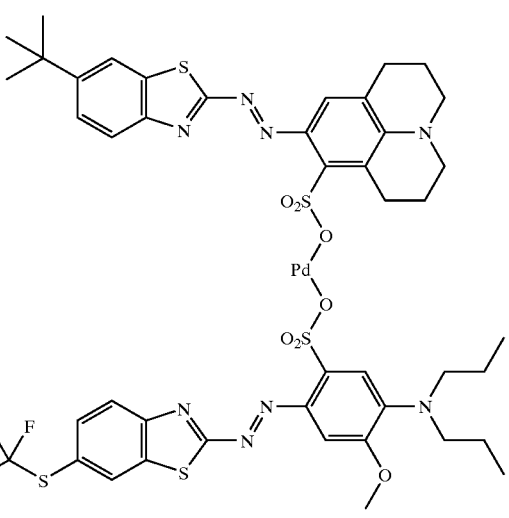
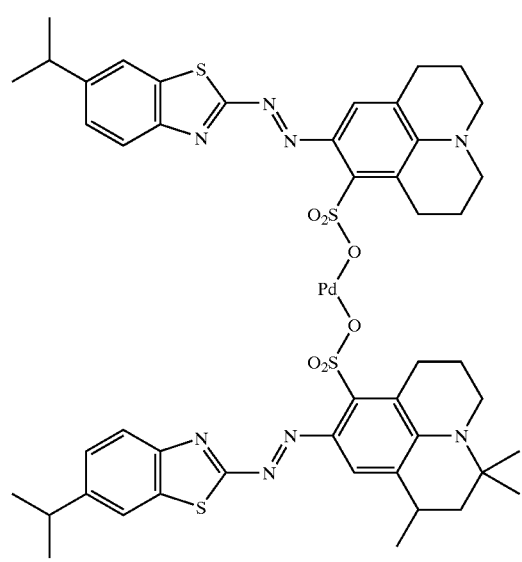
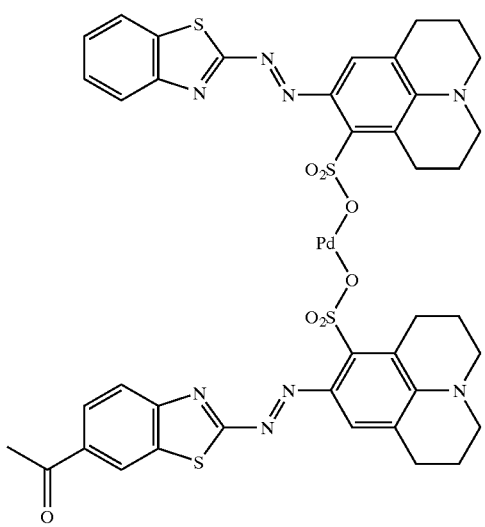

53
-continued
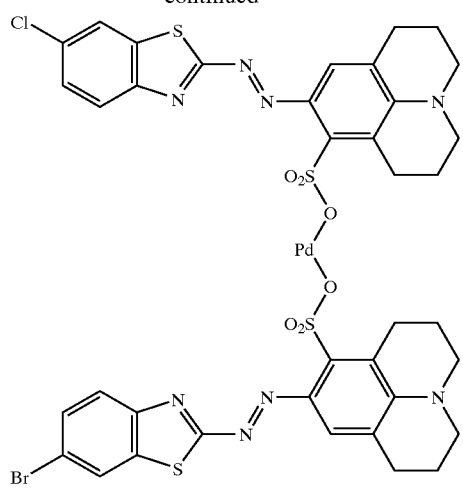
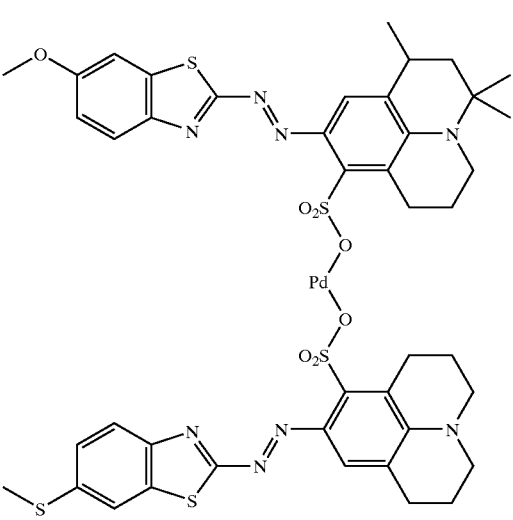
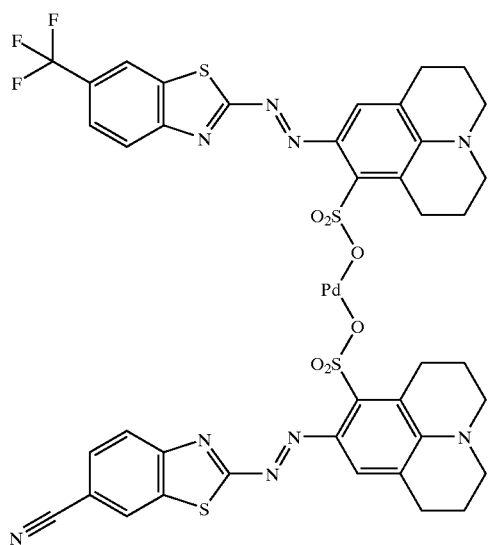
54
-continued
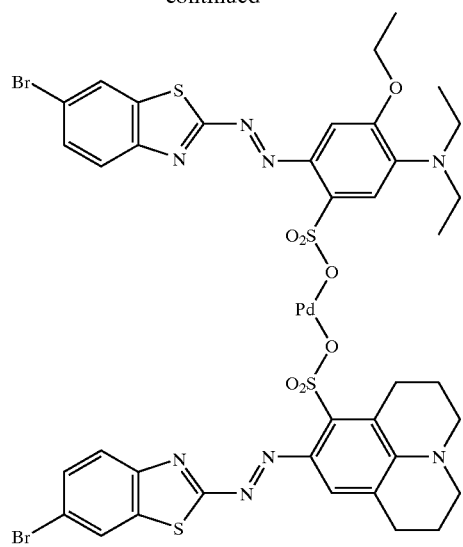
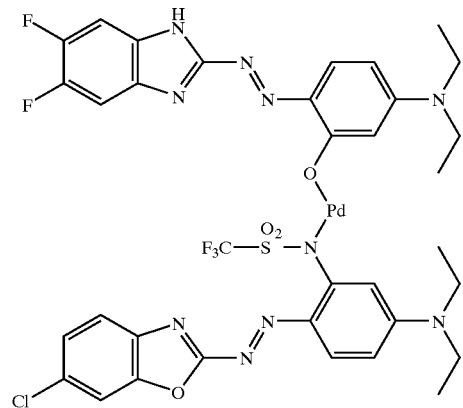
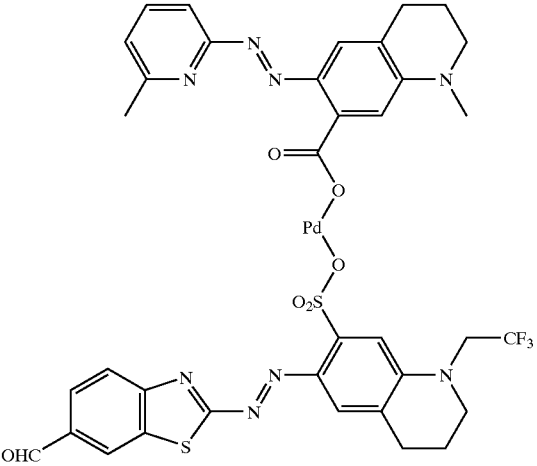

-continued

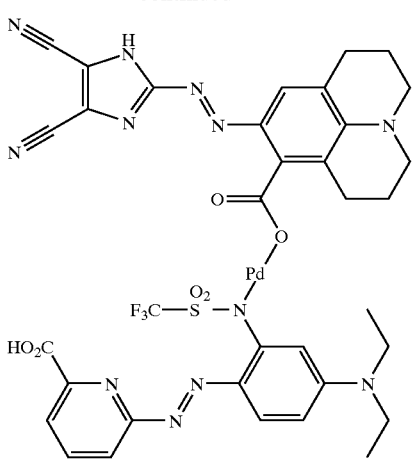

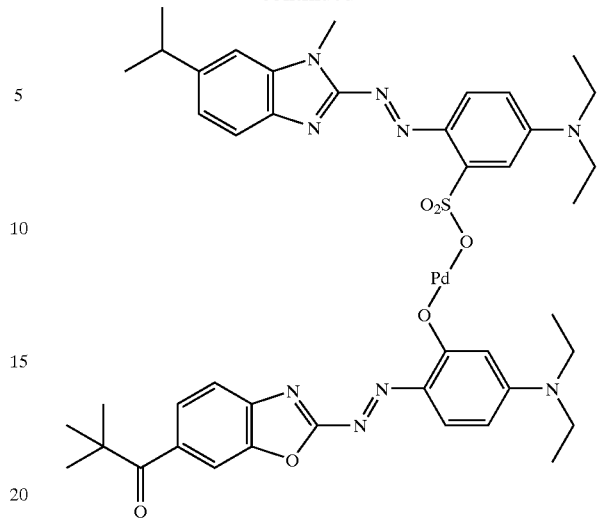

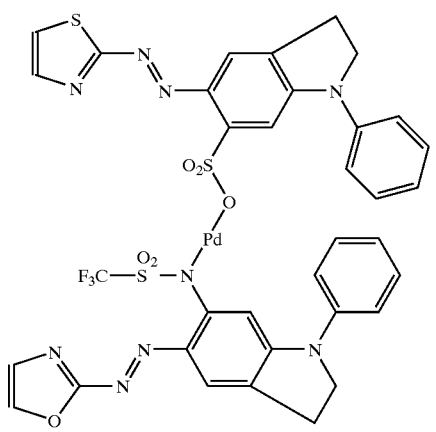

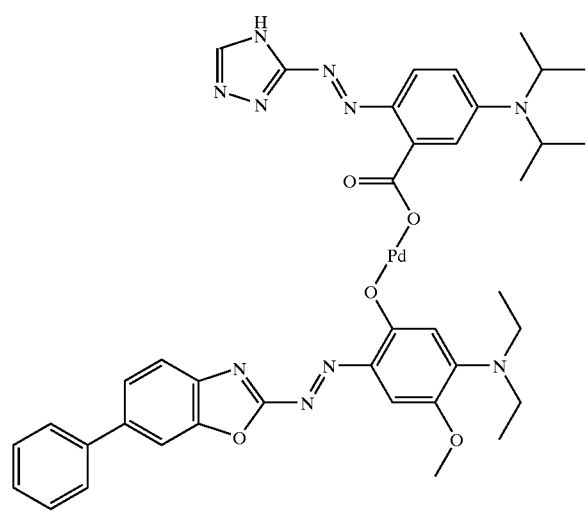

In the present invention, the producing method of a chelate dye comprising two or more azo compounds having different structures and a divalent or more metal ion includes the following method 1 or method 2.

Method 1:

A method of dissolving chelate dye a having azo compound P having the same structure alone as ligands and chelate dye b having azo compound Q having the same structure different in structure from the azo compound P alone in an appropriate solvent, and then allowing the solution to stand at room temperature (about 15 to 30° C.) for 6 hours or more, to thereby perform the exchange of ligands (scheme 1).

P-M-P+Q-M-Q→P-M-Q+P-M-Q  [Scheme 1]

Method 2:

A method of mixing a plurality of azo compounds (e.g., P and Q) and a compound containing a metal ion, to thereby perform a chelation reaction (scheme 2).

P+Q+M→P-M-Q  [Scheme 2]

In the above scheme 1, the producing method of a chelate dye of the present invention was described taking a case of using two kinds of chelate dye a and chelate dye b each having the same ligands in method 1 as an example. In scheme 2, a case of using two kinds of azo compounds P and Q was explained by way of example. However, the chelate dyes in method 1 and the azo compounds in method 2 may be three or more kinds.

In method 1, i.e., in the case of producing the chelate dye of the present invention by a ligand exchange reaction, it is necessary to take reaction time of generally 6 hours or more at room temperature, preferably 12 hours or more, and more preferably 24 hours or more. Specifically, a reaction solution is allowed to stand for 6 hours or more, preferably 12 hours or more, and more preferably 24 hours or more. When a reaction solution is heated, a ligand exchange reaction is expected to progress faster than the case of allowing to stand at room temperature, but if the reaction solution is heated at 100° C. or more, there is a fear that the dyes might be deteriorated or decomposed.

When the reaction time is less than the above range, the reaction results in discontinuance before progressing sufficiently. Therefore, for instance, when a recording layer of an optical recording medium is formed using the reaction as it is, or when the chelate dye is recovered from the reaction solution and used without purifying, the amount of the chelate dye of the present invention occupied in the entire amount of the obtained dye is not sufficient, and probably the performance cannot be exhibited sufficiently. Further, when the objective dye is obtained by purification, the efficient is poor since the proportion of the compound corresponding to impurities is too much.

There is no upper limit in the reaction time but generally the time until ligand exchange reaction in the solution reaches the equilibrium state should be sufficient.

A chelate dye increased in purify by refining may be used in the optical recording medium according to the present invention, alternatively a chelate dye obtained by the above method 1, method 2 or other producing methods may o be used without purification (mixture as it is). The purification can be performed by recrystallization, various kinds of chromatographies or other well-known methods.

In the optical recording medium according to the present invention, the proportion of the chelate dye of the present invention in the entire amount of dyes in a recording layer is preferably 5 mol % or more, more preferably 10 mol % or more. When the optical recording medium contains a plurality of chelate dyes of the present invention, the above amount is the lower limit of the total of chelate dyes. When the amount of the chelate dye of the present invention is less than 5 mol %, there is a fear that the performance of the chelate dye cannot be exhibited sufficiently.

The upper limit of the proportion of the chelate dye according to the present invention is not restricted, but the upper limit of the proportion is 100 mol % when the chelate dye is used after being purified, with any of the dyes obtained by method 1 and method 2.

When the chelate dye obtained by method 1 is used without purification, the proportion of the chelate dye of the present invention is generally 50 mol % or less per one compound, since the proportion becomes maximum when ligand exchange reaction reaches the equilibrium state.

The recording layer of the optical recording medium of the present invention may contain chelate dyes comprising azo dyes having the same ring structure alone, as the ligands, selected from the azo compounds represented by the general formula (I) and the general formula (II), and other dyes, e.g., cyanine dyes, phthalocyanine dyes, azo dyes, triarylmethane dyes, squarylium dyes, and metal-containing indoaniline dyes, within the range not impairing the effect of the present invention.

Preferably, the proportion of the chelate dye according to the present invention (the total amount when a plurality of dyes are used) is from 5 to 95 mol % based on the entire amount of the dyes contained in the recording layer, and the residual moiety comprises chelate dyes having azo compounds of the same structure alone as the ligands. More preferably, the proportion of the chelate dye according to the present invention is from 10 to 90 mol %, and the remainder comprises chelate dyes having azo compounds of the same structure alone as the ligands.

The content of the chelate dye of the present invention in the reaction solution in dye synthesis process according to the above method 1, method 2 and other methods, or in the solution for forming the recording layer in the recording layer forming process of the optical recording medium can be measured and controlled by the liquid phase chromatography.

The optical recording medium according to the present invention fundamentally comprises a substrate and a recording layer containing a chelate dye, but a subbing layer may be provided on the substrate, if necessary. The example of preferred layer constitution include a recordable type recording medium having a reflecting layer and a protective layer laminated on the recording layer in this order to make the medium to have a high reflectance.

As such a substrate, substrates comprising resins, e.g., acrylate resins, methacrylate resins, polycarbonate resins, polyolefin resins (amorphous polyolefin), polyester resins, polystyrene resins and epoxy resins, substrates comprising glass, and a glass substrate having provided thereon a resin layer comprising a radiation-curable resin such as a photo-curable resin can be exemplified.

Injection molded polycarbonate is preferred in view of high productivity, an economical aspect and moisture absorption resistance.

Amorphous polyolefin is preferred in view of chemical resistance and moisture absorption resistance.

A glass substrate is preferred in view of high responsibility.

A resin plate or a resin layer may be provided in contiguous to a recording layer and guide grooves and pits for the light for recording/reproduction may be provided on the resin plate or the resin layer.

The film thickness of the recording layer containing an azo metal chelate dye comprising azo compounds and a metal in the optical recording medium according to the present invention is from 10 to 5,000 nm, preferably from 70 to 3,000 nm.

A recording layer can be formed by ordinarily used film-forming method, e.g., a vacuum deposition method, a sputtering method, a doctor blade method, a cast method, a spinner method and an immersion method. A spinner method is preferred from the viewpoint of mass production and an economical aspect.

A binder can be used, if necessary. Well-known binders, e.g., polyvinyl alcohol, polyvinyl pyrrolidone, a ketone resin, nitrocellulose, cellulose acetate, polyvinyl butyral, polycarbonate can be used in the present invention. When a binder is used in the present invention, it is preferred that the chelate dye of the present invention is contained in a recording layer in an amount of 10 wt % or more.

When a recording layer is formed by the spinner method, the number of revolution is preferably from 500 to 15,000 rpm, and treatment such as heating or application of solvent vapor may be performed after spin coating according to circumstances.

For improving the stability and light fastness of a chelate dye, a transition metal chelate compound (e.g., acetylacetonate chelate, bisphenyldithiol, salicylaldehyde oxime, bisdithio-$\alpha$-diketone) may be contained in a recording layer as a singlet oxygen quencher, and a recording sensitivity improving agent, such as a metal compound, may be contained for improving recording sensitivity. The metal compound is a compound containing a metal such as a transition metal in the form of atom, ion or cluster, and the examples of the metal compounds include organic metal compounds, e.g., ethylenediamine complex, azomethine complex, phenylhydroxylamine complex, phenanthroline complex, dihydroxyazobenzene complex, dioxime complex, nitrosoaminophenol complex, pyridyltriazine complex, acetylacetonate complex, metallocene complex, and porphyrin complex.

The metal atom is not particularly restricted but a transition metal is preferred.

When a recording layer is formed by coating according to a doctor blade method, a cast method, a spinner method or an immersion method, in particular, a spinner method, any solvents can be used with no limitation as long as they can dissolve the dye of the present invention and do not damage the substrate. For example, ketone alcohol solvents, e.g., diacetone alcohol, and 3-hydroxy-3-methyl-2-butanone, cellosolve solvents, e.g., methyl cellosolve and ethyl cellosolve, hydrocarbon solvents, e.g., n-hexane and n-octane, hydrocarbon solvents, e.g., cyclohexane, methylcyclohexane, ethylcyclohexane, dimethylcyclohexane, n-butylcyclohexane, tert-butylcyclohexane, and cyclooctane, ether solvents, e.g., diisopropyl ether and dibutyl ether, perfluoroalkyl alcohol solvents, e.g., tetrafluoropropanol and octafluoropentanol, and hydroxy ester solvents, e.g., methyl lactate, ethyl lactate, and methyl 2-hydroxyisobutyrate can be used.

In the case of vacuum deposition method, a recording layer is formed by charging a crucible equipped in a vacuum container with the components of the recording layer, e.g., the dye of the present invention and, if necessary, other dyes and various additives, exhausting the air in the vacuum container until $10^{-2}$ to $10^{-5}$ Pa or so with an appropriate vacuum pump, heating the crucible to evaporate the recording layer components, and depositing the evaporated components on the substrate placed opposite to the crucible.

A reflecting layer may be formed on the recording layer, and the thickness of the reflecting layer is preferably from 50 to 300 nm. As the material of the reflecting layer, metals having sufficiently high reflectance at the wavelength of the light of reproduction, e.g., Au, Al, Ag, Cu, Ti, Cr, Ni, Pt, Ta, Cr and Pd can be used alone or as alloys. Of these metals, Au, Al and Ag are high in reflectance and preferred as the materials of the reflecting layer. The following metals and semi-metals may be used with Au, Al and Ag as the main components, e.g., Mg, Se, Hf, V, Nb, Ru, W, Mn, Re, Fe, Co, Rh, Ir, Cu, Zn, Cd, Ga, In, Si, Ge, Te, Pb, Po, Sn and Bi. Those containing Ag as the main component are particularly preferably used from the viewpoints that the cost is inexpensive, high reflectance can be easily obtained, and a beautiful print with a white ground can be obtained when a print-receiving layer, which is described later, is provided. Here, the main component means the component-whose content is 50% or more.

It is also possible to form a multilayer film as a reflecting layer by alternately laminating a low refractive index thin layer and a high refractive index thin layer with the materials other than metals.

The reflecting layer can be formed, e.g., by a sputtering method, an ion plating method, a chemical deposition method or a vacuum deposition method. Further, a well-known inorganic or organic intermediate layer and adhesive layer can also be provided on the substrate or under the reflecting layer for the purpose of improving the reflectance, recording characteristics and adhesive property.

The materials of a protective layer provided on the reflecting layer are not particularly restricted so long as they can protect the reflecting layer from the external force. As the organic materials, thermoplastic resins, thermosetting resins, electron beam-curable resins and UV-curable resins can be exemplified. As inorganic materials, $SiO_2$, $SiN_4$, $MgF_2$ and $SnO_2$ can be exemplified.

Thermoplastic resins and thermosetting resins are dissolved in an appropriate solvent to prepare a coating solution, the thus-obtained coating solution is coated and dried, thereby a protective layer is formed. UV-curable resins is coated as it is, or dissolved in an appropriate solvent and the obtained coating solution is coated and irradiated with UV light to be cured, thereby a protective layer is formed. As UV-curable resins, acrylate resins, e.g., urethane acrylate, epoxy acrylate and polyester acrylate can be used in the present invention. These materials may be used alone or as mixture, and they may be used as a monolayer or as a multilayer film.

A protective layer is formed by various methods, e.g., a spin coat method, a cast method, a sputtering method, and a chemical deposition method similarly to the recording layer. A spin coat method is preferred of these methods.

The thickness of a protective layer is generally from 0.1 to 100 $\mu$m, but from 3 to 30 $\mu$m is preferred in the present invention.

The recording layer of the optical recording medium according to the present invention may be provided on both sides or either one side of the substrate. A substrate may further be adhered to the reflecting layer side. Further, two optical recording media may be adhered by opposing reflecting layers mutually as inner surface. A UV-curable resin layer and an inorganic thin layer may be provided on the specular side of the substrate (the side on which a recording layer is not provided) for the purpose of surface protection and preventing dusts from adhering.

A print-receiving layer capable of writing (printing) with various printers, such as an ink jet printer and a heat-sensitive transfer printer, or with various writing tools, may be provided on the side which is not the plane of incidence of the recording/reproduction light.

Recording on the thus-obtained optical recording medium is performed by applying laser beam, preferably semiconductor laser beam, converged into 100 nm or so to the recording layer provided on one side or both sides of the substrate. The irradiated part of the recording layer with laser beam causes thermal deformation, e.g., decomposition, heat evolution and fusion by the absorption of laser beam energy.

The reproduction of the recorded data is effected by reading the difference in reflectance between the part where thermal deformation has occurred and the part where thermal deformation has not occurred.

The laser beam which are used for the optical recording medium according to the present invention include $N_2$, He—Cd, Ax, He—Ne, ruby, a semiconductor, and a dye laser. A semiconductor laser is particularly preferred due to its light weight, easy handling property and compactness.

EXAMPLE

The present invention is described with reference to the Examples but they do not limit the present invention as long as they do not depart from the scope thereof.

Example 1 a) Example of Preparation of Compounds

Compound A

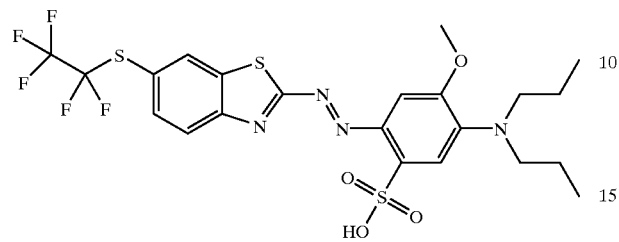

Compound B

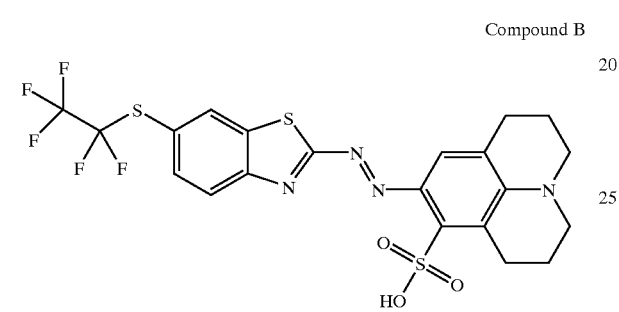

Two (2) grams of compound A and 2 g of compound B were dissolved in 200 ml of methanol and insoluble matters were filtered. A solution of 20 ml of methanol containing 0.4 g of nickel acetate tetrahydrate dissolved therein was w dropwise added to the above solution over S minutes with stirring the solution at 25° C.

The reaction solution was stirred at 25° C. further 1 hour, the solid occurred was filtered, the filtered solid was washed with methanol and dried, thereby a mixture of the compounds represented by the following formulae was obtained.

Compound C

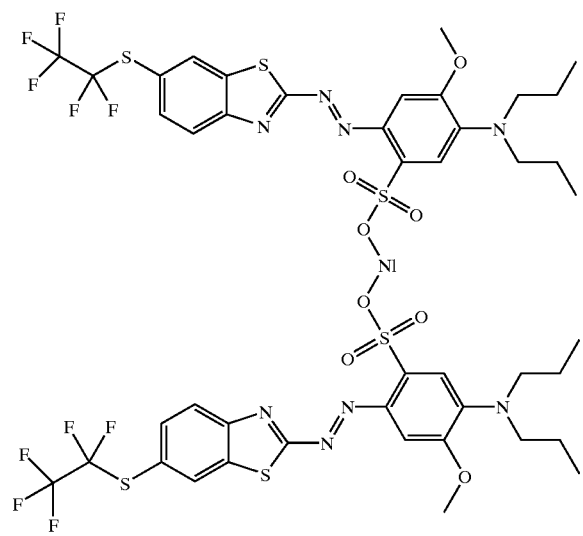

Compound D

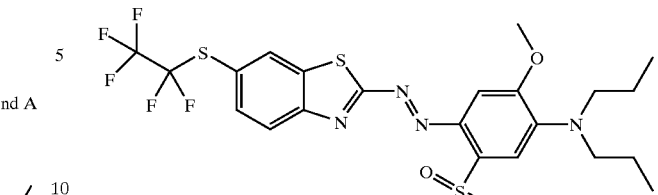

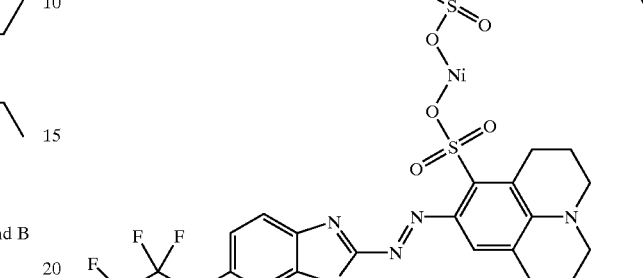

Compound E

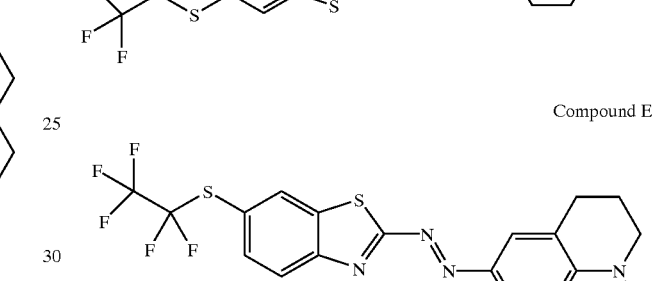

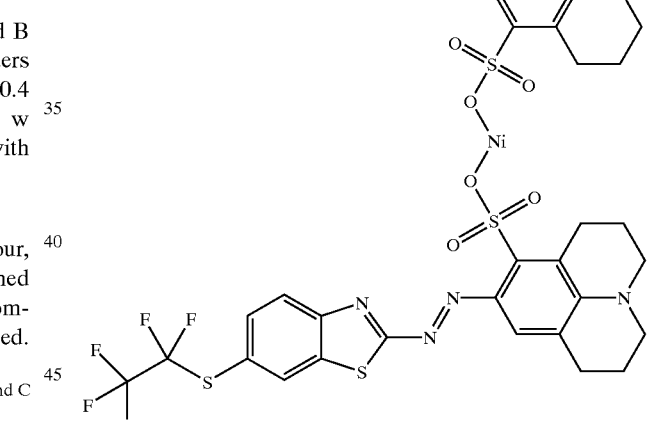

b) Example of Preparation of Recording Medium

Zero point three (0.3) grams of the mixture of compounds C, D and E (molar ratio of C/D/E was 24/50/26) was dissolved in 10 ml of octafluoropentanol, filtered through a filter having a pore diameter of 220 nm, thereby a dye solution was obtained.

On an injection molded polycarbonate resin substrate (diameter: 12 cm) on which guide grooves had been molded in advance, the dye solution was dripped and coated by a spinner method. After coating, the coated layer was dried at 80° C. for 5 minutes. The maximum absorption wavelength of the coated layer was 708 nm.

A silver film having a thickness of 1,000 Å was formed on the above coated layer by a sputtering method to form a reflecting layer. UV-curable resin was further coated on the reflecting layer by spin coating, the resin was cured by irradiation with UV ray, thereby a protective layer having a thickness of 5 μm was obtained.

c) Example of Evaluation

EFM signals were recorded on the above recording medium by irradiating laser beams having central wavelength of 780 nm by recording power of 9.5 mW with rotating the recording medium at 5.6 m/s. The recorded part was then reproduced using a CD player having central wavelength of 780 nm. Good signals were reproduced.

The results of the tests of light fastness (xenon fadeometer acceleration test of 20 hours) and storage stability (70° C., 85% RH, 100 hours) of the disc revealed that both sensitivity and recording characteristics were not deteriorated as compared with those at initial stage, and the disc was extremely excellent as the optical recording medium.

Example 2 b) Example of Preparation of Recording Medium

An optical recording medium was prepared in the same manner as in Example 1 (b) except that 0.15 g of compound C and 0.15 g of compound E (both were chelate dyes) were dissolved in 10 ml of octafluoropentanol, the solution was allowed to stand at room temperature (about 20° C.) for 24 hours, and then filtered through a filter, and the thus-obtained dye solution was used. The proportion of compounds C, D and in the dye solution was 24/50/26 (in molar ratio).

c) Example of Evaluation

EFM signals were recorded on the above recording medium by irradiating laser beams having central wavelength of 780 nm by recording power of 9.5 mW with rotating the recording medium at 5.6 m/s. The recorded part was then reproduced using a CD player having central wavelength of 780 nm. Good signals were reproduced.

The results of the tests of light fastness (xenon fadeometer acceleration test of 20 hours) and storage stability (70° C., 85% RH, 100 hours) of the disc revealed that both sensitivity and recording characteristics were not deteriorated as compared with those at initial stage, and the disc was extremely excellent as the optical recording medium.

Comparative Example 1 b) Example of Preparation of Recording Medium

An optical recording medium was prepared in the same manner as in Example 1 (b) except that 0.3 g of compound C was dissolved in 10 ml of octafluoropentanol, the solution was filtered through a filter, and the thus-obtained dye solution was used.

c) Example of Evaluation

EFM signals were recorded on the above recording medium by irradiating laser beams having central wavelength of 780 nm by recording power of 9.5 mW with rotating the recording medium at 5.6 m/s. The recorded part was then reproduced using a CD player having central wavelength of 780 nm. Signals could not be read out.

Further, EFM signals were recorded on the above recording medium by irradiating laser beams having central wavelength of 780 nm by recording power of 12.5 mW with rotating the recording medium at 5.6 m/s. The recorded part was then reproduced using a CD player having central wavelength of 780 nm. Good signals were reproduced.

In optical recording example (c) in Examples 1 and 2, good recording is feasible even with lower recording power then in Comparative Example 1. It can been seen from these results that the optical recording media using the dyes according to the present invention are high sensitivity and preferably used for high speed recording.

Comparative Example 2 b) Example of Preparation of Recording Medium

An optical recording medium was prepared in the same manner as in Example 1 (b) except that 0.3 g of compound E was dissolved in 10 ml of octafluoropentanol, the solution was filtered through a filter, and the thus-obtained dye solution was used.

c) Example of Evaluation

EFM signals were recorded on the above recording medium by irradiating laser beams having central wavelength of 780 nm by recording power of 9.5 mW with rotating the recording medium at 5.6 m/s. The recorded part was then reproduced using a CD player having central wavelength of 780 nm. Good signals were reproduced.

The results of the tests of light fastness (xenon fadeometer acceleration test of 20 hours) and storage stability (70° C., 65% RH, 100 hours) of the disc revealed that both sensitivity and recording characteristics were markedly deteriorated as compared with those at initial stage, and recording and reproduction were impossible.

The optical recording media in Examples 1 and 2 are superior to the medium in Comparative Example 2 in light fastness and storage stability, thus they are excellent as the optical recording medium.

Example 3 b) Example of Preparation of Recording Medium

Compound F

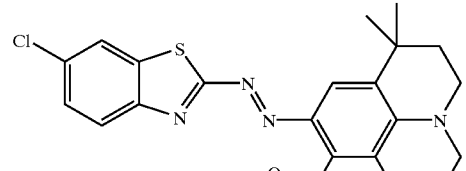

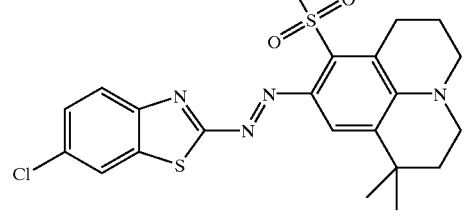

Compound G

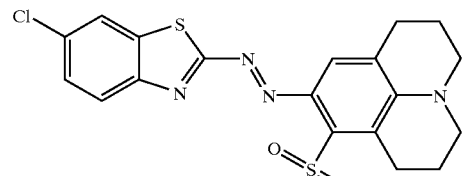

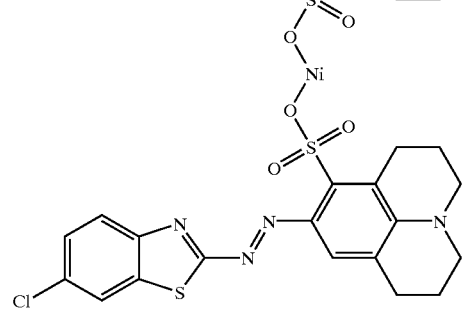

Compound H

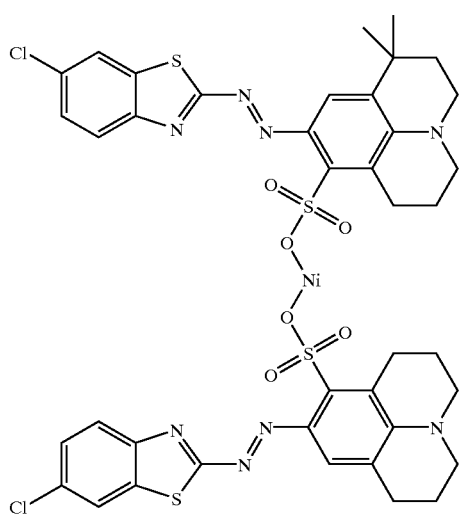

An optical recording medium was prepared in the same manner as in Example 1 (b) except that 0.15 g of compound F and 0.15 g of compound G (both were chelate dyes) were dissolved in 10 ml of octafluoropentanol, the solution was allowed to stand at room temperature (about 20° C.) for 24 hours, and then filtered through a filter, and the thus-obtained dye solution was used. The maximum absorption wavelength of the coated layer was 715 nm. The proportion of compounds F, H, and G and in the dye solution was 24/50/26 (in molar ratio).

c) Example of Optical Recording

EFM signals were recorded on the above recording medium by irradiating laser beams having central wavelength of 780 nm by recording power of 12.5 mW with rotating the recording medium at 5.6 m/s.

The recorded part was then reproduced using a CD player having central wavelength of 780 nm. Good signals were reproduced.

Comparative Example 3
b) Example of Preparation of Recording Medium

An optical recording medium was prepared in the same manner as in Example 1 (b), except for the following, i.e., 0.3 g of compound F was dissolved in 10 ml of octafluoropentanol but compound F was not dissolved completely since the solubility was low, therefore compound F which remained undissolved was filtered through a filter, and the thus-obtained dye solution was used.

c) Example of Evaluation

EFM signals were recorded on the above recording medium by irradiating laser beams having central wavelength of 780 nm by recording power of 12.5 mW with rotating the recording medium at 5.6 m/s.

The recorded part was then reproduced using a CD player having central wavelength of 780 nm. Signals could not be read out.

Comparative Example 4
b) Example of Preparation of Recording Medium

An optical recording medium was prepared in the same manner as in Example 1 (b), except for the following, i.e., 0.3 g of compound G was dissolved in 10 ml of octafluoropentanol but compound G was not dissolved completely since the solubility was low, therefore compound G which remained undissolved was filtered through a filter, and the thus-obtained dye solution was used.

c) Example of Evaluation

EFM signals were recorded on the above recording medium by irradiating laser beams having central wavelength of 780 nm by recording power of 12.5 mW with rotating the recording medium at 5.6 m/s.

The recorded part was then reproduced using a CD player having central wavelength of 780 nm. Signals could not be read out.

It can be seen from the above results that the optical recording medium in Example 3 is superior to those in Comparative Examples 3 and 4.

Industrial Applicability

The present invention can provide a well-balanced optical recording medium which can satisfy various requisite performances on a high level.

While the invention has been described in detail and with reference to specific examples thereof, it will be apparent to one skilled in the art that various changes and modifications can be made therein without departing from the spirit and scope thereof.

This application is based on Japanese patent application No. 2000-114611 filed Apr. 17, 2000, the entire contents thereof being hereby incorporated by reference.

What is claimed is:

1. An optical recording medium comprising a substrate and a laser-writable and/or readable recording layer provided thereon, wherein said recording layer contains a chelate dye comprising two or more azo compounds having different structures and a divalent or more metal ion, wherein said azo compounds are selected from compounds represented by the following formula (I):

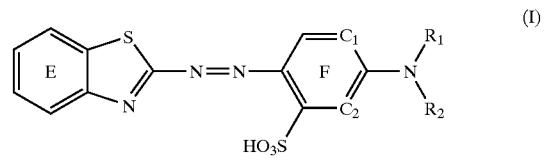

wherein ring E may have substituent(s), $C_1$ and $C_2$ each represents a carbon atom, and $R_1$ and $R_2$ each independently represent a hydrogen atom, an alkyl group, an aryl group, an alkenyl group, a cyclic alkenyl group or a cyclic alkyl group, or $R_1$ and $R_2$ may be bonded to each other to form a ring, and wherein the following conditions (1), (2) or (3) may apply:

(1) $R_1$ and $C_1$ are bonded to each other to form a saturated ring condensed with ring F, (2) $R_2$ and $C_2$ are bonded to each other to form a saturated ring condensed with ring F, (3) both $R_1$ and $R_2$, with both $C_1$ and $C_2$, respectively, form a saturated ring condensed with ring F, with the proviso that in at least one of said two or more azo compounds, (1), (2), or (3) applies, and wherein the chelate dye has a degree of ligand exchange of at least that obtained by mixing a chelate dye obtained by reacting one of said two or more azo compounds with said divalent or more metal ion, with another chelate dye obtained by reacting a different one of said two or more azo compounds with said divalent or more metal ion, in a solvent, thereby forming a solution, and then allowing the solution to stand at room temperature for six hours or more, thereby performing exchange of ligands.

2. The optical recording medium as claimed in claim 1, which comprises a plurality of said chelate dyes.

3. The optical recording medium as claimed in claim 1, wherein said chelate dye accounts for 5 mol % or more of the total amount of the dyes contained in the recording layer.

4. The optical recording medium as claimed in claim 3, wherein said chelate dye accounts for 5 to 9 mol % of the total amount of the dyes contained in the recording layer.

* * * * *